(12) United States Patent
Zheng et al.

(10) Patent No.: US 12,132,674 B2
(45) Date of Patent: Oct. 29, 2024

(54) UPLINK TRANSMISSION METHOD AND DEVICE

(71) Applicant: ZTE CORPORATION, Guangdong (CN)

(72) Inventors: Guozeng Zheng, Guangdong (CN); Hao Wu, Guangdong (CN); Yong Li, Guangdong (CN); Chuangxin Jiang, Guangdong (CN)

(73) Assignee: ZTE CORPORATION (CN)

( * ) Notice: Subject to any disclaimer, the term of this patent is extended or adjusted under 35 U.S.C. 154(b) by 391 days.

(21) Appl. No.: 17/642,494

(22) PCT Filed: Sep. 11, 2020

(86) PCT No.: PCT/CN2020/114826
§ 371 (c)(1),
(2) Date: Mar. 11, 2022

(87) PCT Pub. No.: WO2021/047647
PCT Pub. Date: Mar. 18, 2021

(65) Prior Publication Data
US 2022/0345266 A1 Oct. 27, 2022

(30) Foreign Application Priority Data
Sep. 12, 2019 (CN) .......................... 201910867153.9

(51) Int. Cl.
*H04L 5/00* (2006.01)
*H04B 1/713* (2011.01)
*H04W 72/23* (2023.01)

(52) U.S. Cl.
CPC ........... *H04L 5/0048* (2013.01); *H04W 72/23* (2023.01)

(58) Field of Classification Search
CPC ...... H04W 72/23; H04L 5/001; H04L 5/0064; H04L 5/0094; H04B 1/713
See application file for complete search history.

(56) References Cited

U.S. PATENT DOCUMENTS

2016/0381589 A1* 12/2016 Zhang .................. H04L 5/0053
370/252
2019/0222277 A1 7/2019 Park et al.
(Continued)

FOREIGN PATENT DOCUMENTS

CN 102244559 A 11/2011
CN 104735789 A 6/2015
(Continued)

OTHER PUBLICATIONS

3GPP TSG RAN WG1#48bis Title:Sequence Hopping for the Uplink Reference Signal (Year: 2007).*
(Continued)

*Primary Examiner* — Faruk Hamza
*Assistant Examiner* — Abusayeed M Haque
(74) *Attorney, Agent, or Firm* — McDonald Hopkins LLC

(57) ABSTRACT

Provided are an uplink transmission method and device. The uplink transmission method is applied to a first communication node and includes: receiving a downlink reference signal sent by a second communication node and acquiring downlink channel information; sending an uplink reference signal by using the downlink channel information; monitoring downlink control signaling sent by the second communication node, where the downlink control signaling includes a sub-band SRS resource indication; and sending an uplink transmission channel according to scheduling of the downlink control signaling.

9 Claims, 8 Drawing Sheets

(56) References Cited

U.S. PATENT DOCUMENTS

| | | | |
|---|---|---|---|
| 2020/0112359 A1* | 4/2020 | Park | H04L 5/0053 |
| 2020/0214015 A1* | 7/2020 | Zhou | H04L 5/0092 |
| 2020/0344012 A1* | 10/2020 | Karaki | H04L 1/1861 |
| 2022/0006571 A1* | 1/2022 | Basu Mallick | H04L 5/0055 |
| 2022/0039156 A1* | 2/2022 | Golitschek Edler von Elbwart | H04W 24/08 |
| 2022/0150019 A1* | 5/2022 | Xiao | H04L 5/0053 |

FOREIGN PATENT DOCUMENTS

| | | | | |
|---|---|---|---|---|
| CN | 107733496 A | 2/2018 | | |
| CN | 108111282 A | 6/2018 | | |
| CN | 109526246 A | 3/2019 | | |
| CN | 109600838 A | 4/2019 | | |
| CN | 110071749 A | 7/2019 | | |
| CN | 110545168 A | 12/2019 | | |
| IN | 201927004587 A | 7/2019 | | |
| WO | 2013064122 A1 | 5/2013 | | |
| WO | WO-2013191367 A1 * | 12/2013 | | H04B 1/3838 |
| WO | 2017171523 A1 | 5/2017 | | |
| WO | 2018056789 A1 | 3/2018 | | |
| WO | 2018097586 A1 | 5/2018 | | |
| WO | 2019085998 A1 | 5/2019 | | |
| WO | WO-2020022523 A1 * | 1/2020 | | H04L 1/1614 |

OTHER PUBLICATIONS

3GPP TSG RAN WG1 Meeting 71, R1-124782 Title:RI and Sub-band Index Constrains for Periodic CSI (Year: 2012).*

3GPP TSG RAN WG1#48bis, R1-071485 Title:Sequence Hopping for the Uplink Reference Signal (Year: 2007).*

Intellectual Property India, Examination Report for Application No. 202227016559, report issue date Sep. 8, 2022.

International Search Report and Written Opinion mailed Nov. 17, 2020; International Patent Application No. PCT/CN2020/114826 filed on Sep. 11, 2020.

Huawei et al., "Non-codebook based transmission for UL MIMO" 3GPP Draft R1-1717296, 2017, Czech Republic.

Nokia et al., "Summary of issues on UL non-codebook based transmission," Draft R1-1718871, 2017, Czech Republic.

Extended European Search Report for Application 20863266.1, PCT/CN2020/114826, dated Sep. 1, 2023, 9 pgs., European Patent Office, Germany.

Office Action dated Apr. 12, 2014; Chinese Patent Application No. 201910867153.9; 6 pages.

Search report dated Apr. 9, 2014; Chinese Patent Application No. 201910867153.9; 3 pages.

3GPP TSG-RAN WG1 Meeting #52, "R1-081155," Sorrento, Italy 11-15, 2008. 72 pages.

* cited by examiner

UPLINK TRANSMISSION METHOD AND DEVICE

This application is a U.S. National Stage Application, filed under 35 U.S.C. 371 of International Patent Application No. PCT/CN2020/114826 filed Sep. 11, 2020, which claims priority to Chinese Patent Application No. 201910867153.9 filed with the China National Intellectual Property Administration (CNIPA) on Sep. 12, 2019, the disclosures of each of which are incorporated herein by reference in their entireties.

TECHNICAL FIELD

The present application relates to a wireless communication network, for example, an uplink transmission method and device.

BACKGROUND

With the development of communication technologies and application requirements, the throughput and coverage of an uplink transmission channel of a terminal become more and more important. Different from downlink transmission which may use technologies such as large-scale antenna technology and frequency selective precoding technology, uplink transmission of the terminal is generally performed at a lower throughput than downlink reception, due to limitations of the space size, hardware cost, hardware implementation complexity and other factors of the terminal.

The terminal improves the throughput and coverage of the uplink transmission channel by using technologies such as power control, precoding and beams. For example, in the precoding technology, the uplink transmission uses wideband precoding through which the estimation of a channel has insufficient accuracy so that the performance of the uplink transmission is improved to a limited extent.

SUMMARY

The present application provides an uplink transmission method and device to enable an uplink transmission channel to use precoding estimated by downlink channel information and indicate precoding information of sub-band granularity, which improves channel estimation accuracy and is conducive to enhancing uplink transmission.

Embodiments of the present application provide an uplink transmission method. The uplink transmission method is applied to a first communication node and includes the following.

A downlink reference signal sent by a second communication node is received and downlink channel information is acquired.

An uplink reference signal is sent by using the downlink channel information.

Downlink control signaling sent by the second communication node is monitored, where the downlink control signaling includes a sub-band sounding reference signal (SRS) resource indication.

An uplink transmission channel is sent according to scheduling of the downlink control signaling.

In a possible implementation, the uplink reference signal includes N SRS resource groups and an i-th SRS resource group includes $M_i$ SRS resources, where each of the N SRS resource groups is associated with one downlink reference signal, i, N and $M_i$ are integers greater than or equal to 1, and $1 \leq i \leq N$.

In a possible implementation, an association relationship between an SRS resource and a phase tracking reference signal (PTRS) port includes any one of the manners described below.

All SRS resources are associated with no PTRS ports.
Each SRS resource is associated with one PTRS port.

In a possible implementation, that the uplink reference signal is sent by using the downlink channel information includes the following.

Precoding of each uplink sub-band of the uplink reference signal is determined according to the downlink channel information.

The uplink reference signal is generated according to the precoding of each uplink sub-band of the uplink reference signal and sent.

In a possible implementation, a division manner of the uplink sub-band includes at least one of the methods described below.

Division is performed according to a bandwidth of a carrier component where the uplink transmission channel is located and a size of sub-band division granularity.

Division is performed according to a frequency domain range of a bandwidth part (BWP) where the uplink transmission channel is located and a size of sub-band division granularity.

Division is performed according to a frequency domain range of an SRS resource and a size of sub-band division granularity.

In a possible implementation, the size of the sub-band division granularity is indicated in at least one of the following manners: higher layer signaling, physical layer signaling, the bandwidth of the carrier component where the uplink transmission channel is located, the frequency domain range of the BWP where the uplink transmission channel is located or the frequency domain range of the SRS resource.

In a possible implementation, the downlink control signaling includes any one of the manners described below.

One DCI is used for scheduling the uplink transmission channel.

Two DCIs are used for independently scheduling the uplink transmission channel.

Two DCIs are used for jointly scheduling the uplink transmission channel.

In a possible implementation, the one DCI for scheduling the uplink transmission channel contains the sub-band SRS resource indication.

In a possible implementation, frequency domain ranges indicated by the two DCIs for independently scheduling the uplink transmission channel do not overlap and each of the two DCIs for independently scheduling the uplink transmission channel contains the sub-band SRS resource indication.

In a possible implementation, the two DCIs for jointly scheduling the uplink transmission channel include first DCI and second DCI by which the uplink transmission channel is jointly scheduled.

In a possible implementation, the first DCI includes at least one of the following information: a carrier indication, a BWP indication, frequency domain resource allocation, time domain resource allocation, a frequency hopping indication, a frequency hopping offset indication, a modulation and coding scheme, a redundancy version, a process number, an SRS resource indication, an SRS resource group indication, an indication of a number of transmission layers, a demodulation reference signal (DMRS) port indication, a DMRS sequence initialization indication or an indication of a size of the second DCI.

The second DCI includes at least one of the following information: a plurality of uplink sub-band numbers, multiple sub-band SRS resource indications, the modulation and coding scheme, the redundancy version, a redundancy version offset, the DMRS sequence initialization indication or a DMRS sequence initialization offset indication.

In a possible implementation, a size of information bits of the second DCI is determined in at least one of the following manners: the indication of the size of the second DCI in the first DCI, the association relationship between the SRS resource and the PTRS port, the number of SRS resource groups, the number of SRS resources contained in each SRS resource group, a selection of an SRS resource group, the number of SRS resources contained in each uplink sub-band, the frequency hopping indication in the first DCI, the frequency hopping offset indication in the first DCI, the SRS resource indication in the first DCI or the frequency domain resource allocation in the first DCI.

In a possible implementation, the number of SRS resources contained in each uplink sub-band is the number of SRS resources in a frequency domain range occupied by the corresponding uplink sub-band; and a relationship between the number of SRS resources contained in each uplink sub-band and a total number of SRS resources includes at least one of the manners described below.

All SRS resources are configured to occupy the same frequency domain range.

Different SRS resources occupy different frequency domain ranges, and the division manner of the uplink sub-band is used for ensuring that the number of SRS resources contained in each uplink sub-band is the same as the total number of SRS resources.

An uplink sub-band contains SRS resources whose number is smaller than the total number of SRS resources, and a frequency domain range to which the uplink sub-band belongs cannot be used for scheduling the uplink transmission channel.

No corresponding sub-band SRS resource indication exists for an uplink sub-band which contains SRS resources whose number is smaller than the total number of SRS resources.

An uplink sub-band which contains SRS resources whose number is smaller than the total number of SRS resources is used for scheduling the uplink transmission channel, and a corresponding sub-band SRS resource indication exists for the uplink sub-band.

In a possible implementation, the multiple uplink sub-band numbers are determined by at least one of the following information: the division manner of the uplink sub-band, the frequency hopping indication in the first DCI, the frequency hopping offset indication in the first DCI or the frequency domain resource allocation in the first DCI.

In a possible implementation, a bit width of each sub-band SRS resource indication is determined by at least one of the following information: the association relationship between the SRS resource and the PTRS port, the number of SRS resource groups, the number of SRS resources contained in each SRS resource group, the selection of the SRS resource group, the SRS resource indication in the first DCI or the number of SRS resources contained in each uplink sub-band.

In a possible implementation, a relationship between the multiple uplink sub-band numbers and the multiple sub-band SRS resource indications in the second DCI includes at least one of the manners described below.

The second DCI contains the multiple sub-band SRS resource indications and no uplink sub-band number.

The second DCI contains the multiple uplink sub-band numbers and the multiple sub-band SRS resource indications, where one of the multiple uplink sub-band numbers corresponds to one of the multiple sub-band SRS resource indications.

The second DCI contains the multiple uplink sub-band numbers and the multiple sub-band SRS resource indications, where one group of uplink sub-band numbers among the plurality of uplink sub-band numbers corresponds to one of the multiple sub-band SRS resource indications.

In a possible implementation, whether the second DCI exists is determined in any one of the following manners: radio resource control (RRC) signaling, media access control control element (MAC CE) signaling or prompt information in the first DCI.

In a possible implementation, the prompt information in the first DCI includes at least one of the following information: a scrambling code of the first DCI, the redundancy version in the first DCI, the SRS resource indication in the first DCI, the SRS resource group indication in the first DCI or the DMRS sequence initialization indication in the first DCI.

In a possible implementation, the number of layers of the uplink transmission channel is determined by at least one of the following information: an SRS resource indication in the first DCI, an indication of the number of transmission layers in the first DCI, a DMRS port indication in the first DCI or multiple sub-band SRS resource indications in the second DCI.

In a possible implementation, that the uplink transmission channel is sent according to the scheduling of the downlink control signaling includes the following.

In the case where the second DCI fails to be monitored, the uplink transmission channel is scheduled according to the first DCI.

In the case where the second DCI is successfully monitored, the uplink transmission channel is jointly scheduled according to the first DCI and the second DCI.

In a possible implementation, the second communication node determines that the second DCI is successfully monitored in at least one of the manners described below.

The uplink transmission channel uses the modulation and coding scheme indicated by the second DCI.

The uplink transmission channel uses the redundancy version indicated by the second DCI.

A redundancy version of the uplink transmission channel is jointly determined by the redundancy version indicated by the first DCI and the redundancy version offset indicated by the second DCI.

DMRS sequence initialization of the uplink transmission channel uses the DMRS sequence initialization indication in the second DCI.

DMRS sequence initialization of the uplink transmission channel is jointly determined by DMRS sequence initialization indicated by the first DCI and a DMRS sequence initialization offset indicated by the second DCI.

In a possible implementation, the sub-band SRS resource indication is used for indicating precoding of the uplink transmission channel, and precoding used by the uplink transmission channel on each uplink sub-band is determined by a sub-band SRS resource indication corresponding to the each uplink sub-band.

Embodiments of the present application provide an uplink transmission method. The uplink transmission method is applied to a second communication node and includes the following.

A downlink reference signal is sent to a first communication node, where the downlink reference signal is used for acquiring downlink channel information.

An uplink reference signal sent by the first communication node using the downlink channel information is received.

Downlink control signaling is sent to the first communication node, where the downlink control signaling includes a sub-band SRS resource indication.

An uplink transmission channel sent by the first communication node according to scheduling of the downlink control signaling is received.

In a possible implementation, that the uplink reference signal is sent by using the downlink channel information includes the following.

Precoding of each uplink sub-band of the uplink reference signal is determined according to the downlink channel information.

The uplink reference signal is generated according to the precoding of each uplink sub-band of the uplink reference signal and sent.

In a possible implementation, a division manner of the uplink sub-band includes at least one of the methods described below.

Division is performed according to a bandwidth of a carrier component where the uplink transmission channel is located and a size of sub-band division granularity.

Division is performed according to a frequency domain range of a BWP where the uplink transmission channel is located and a size of sub-band division granularity.

Division is performed according to a frequency domain range of an SRS resource and a size of sub-band division granularity.

Embodiments of the present application provide an uplink transmission device. The uplink transmission device includes a processor and a memory, where the processor is configured to execute a program instruction stored in the memory to perform any one of the preceding possible implementations of the uplink transmission method.

Embodiments of the present application provide an uplink transmission device. The uplink transmission device is disposed in a first communication node and includes a reference signal receiving module, a reference signal sending module, a monitoring module and a channel sending module.

The reference signal receiving module is configured to receive a downlink reference signal sent by a second communication node and acquire downlink channel information.

The reference signal sending module is configured to send an uplink reference signal using the downlink channel information.

The monitoring module is configured to monitor downlink control signaling sent by the second communication node, where the downlink control signaling includes a sub-band SRS resource indication.

The channel sending module is configured to send an uplink transmission channel according to scheduling of the downlink control signaling.

Embodiments of the present application provide an uplink transmission device. The uplink transmission device is disposed in a second communication node and includes a reference signal sending module, a reference signal receiving module, a signaling sending module and a channel receiving module.

The reference signal sending module is configured to send a downlink reference signal to a first communication node, where the downlink reference signal is used for acquiring downlink channel information.

The reference signal receiving module is configured to receive an uplink reference signal sent by the first communication node using the downlink channel information.

The signaling sending module is configured to send downlink control signaling to the first communication node, where the downlink control signaling includes a sub-band SRS resource indication.

The channel receiving module is configured to receive an uplink transmission channel sent by the first communication node according to scheduling of the downlink control signaling.

Embodiments of the present application provide an uplink transmission system. The uplink transmission system includes a first communication node and a second communication node.

The first communication node includes any one of the uplink transmission devices disposed in the first communication node.

The second communication node includes any one of the uplink transmission devices disposed in the second communication node.

DETAILED DESCRIPTION

Embodiments of the present application are described hereinafter in detail in conjunction with drawings.

In wireless communication, when an uplink channel and a downlink channel have reciprocity, the estimation of the downlink channel may be provided based on reciprocity for uplink transmission, reducing an overhead and increasing precoding accuracy. However, when the uplink channel and the downlink channel have the reciprocity, how to select precoding of a sub-band for an uplink transmission channel is an urgent problem to be solved.

Figure 1:
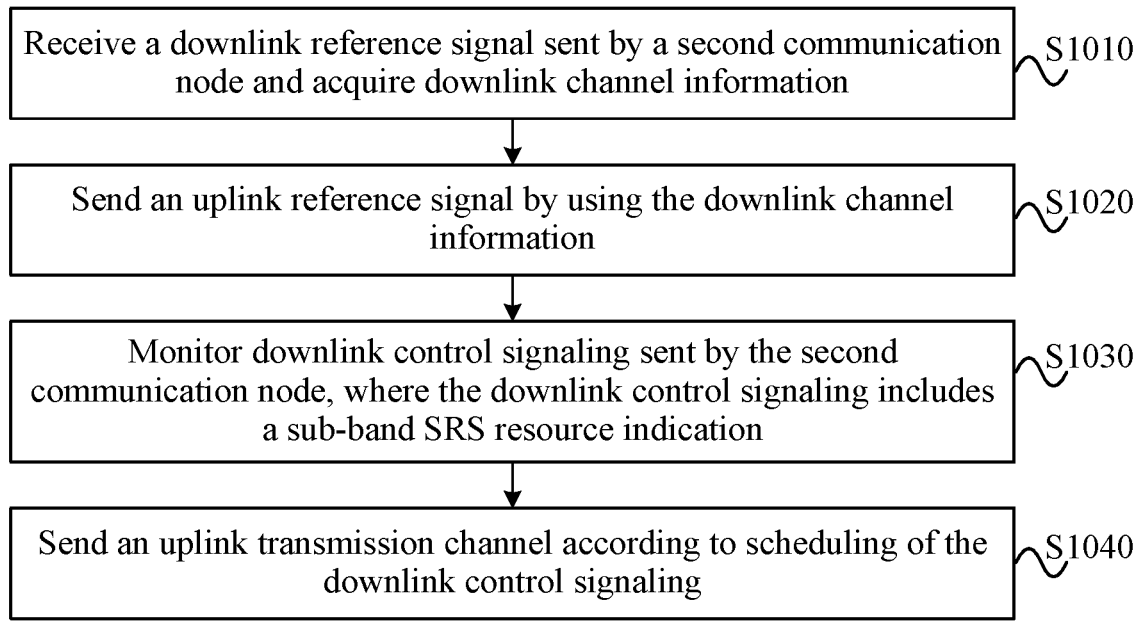
FIG. 1 is a flowchart of an uplink transmission method according to an embodiment.

FIG. 1 is a flowchart of an uplink transmission method according to an embodiment. As shown in FIG. 1, the method provided in the present embodiment includes the following.

In S1010, a downlink reference signal sent by a second communication node is received, and downlink channel information is acquired.

The uplink transmission method provided in the present embodiment is applied to a first communication node in a wireless communication system. The first communication node is, for example, a user equipment (UE). In the wireless communication system, the UE performs uplink transmission using an uplink transmission channel. A base station sends downlink data and downlink signaling to the UE through a downlink transmission channel. When an uplink channel and a downlink channel between the base station and the UE have reciprocity, that is, the uplink channel and the downlink channel between the base station and the UE experience the same spatial environment, and the UE may send the uplink transmission channel using the downlink channel information acquired by the downlink reference signal sent by the base station. For example, for precoding used for the uplink transmission channel, a conventional uplink transmission channel uses wideband precoding. However, the wideband precoding has insufficient accuracy so that the performance of the uplink transmission is improved to a limited extent. When the uplink channel and the downlink channel between the base station and the UE have the reciprocity, the present embodiment considers that precoding information calculated using the downlink channel information is applied to the uplink transmission channel.

Firstly, the UE as the first communication node needs to receive the downlink reference signal sent by the base station as the second communication node and acquire the downlink channel information from the downlink reference signal.

In S1020, an uplink reference signal is sent by using the downlink channel information.

After acquiring the downlink channel information, the first communication node calculates, based on the downlink channel information, the precoding information of the uplink transmission channel and caches the precoding information. From the cached precoding information, the precoding is selected for generating the uplink reference signal, and selection information of the precoding is cached.

That the uplink reference signal is sent by using the downlink channel information includes: determining precoding of each uplink sub-band of the uplink reference signal according to the downlink channel information; and generating the uplink reference signal according to the precoding of each uplink sub-band of the uplink reference signal and sending the uplink reference signal.

Figure 2:
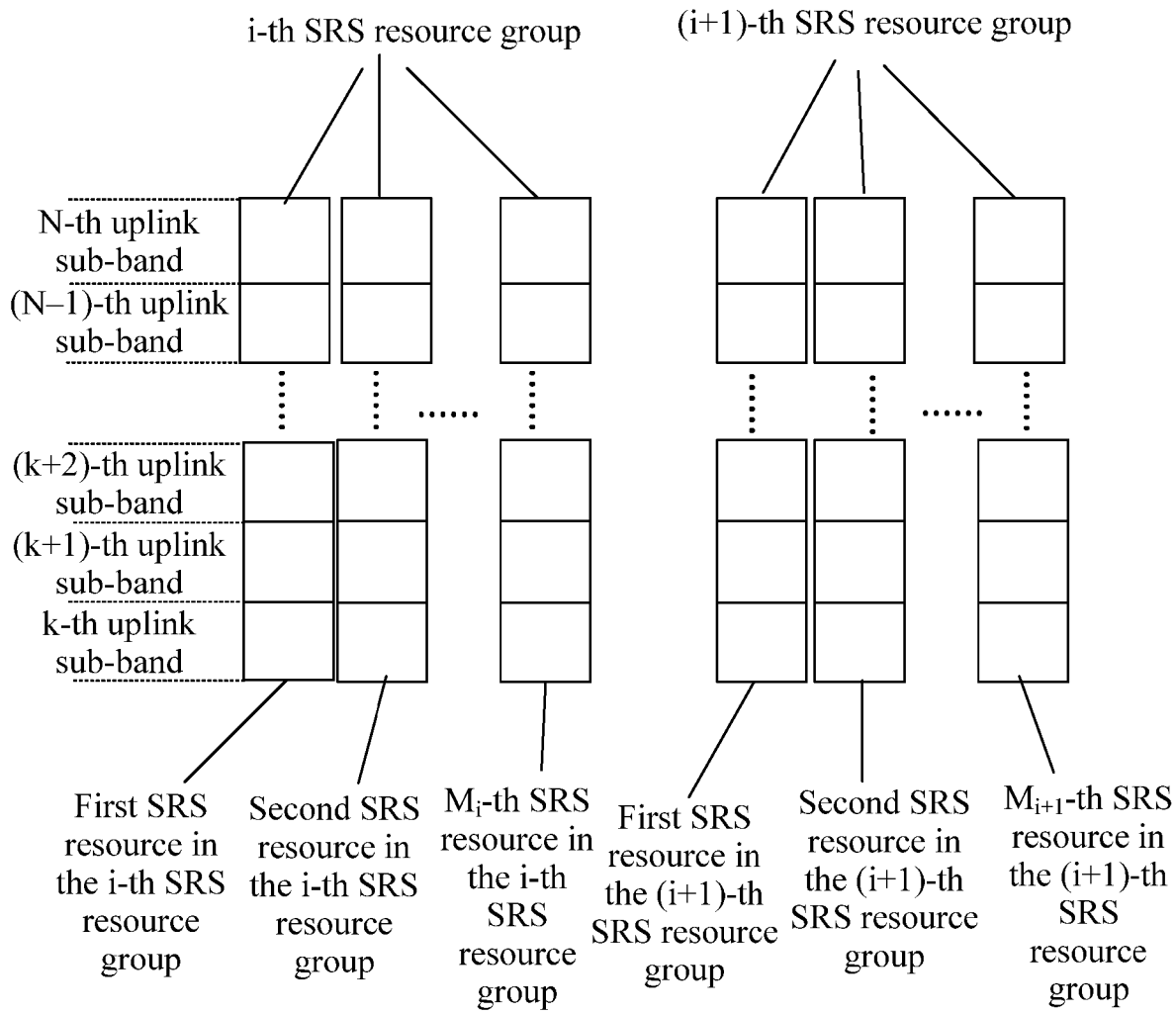
FIG. 2 is a schematic diagram of SRS resources of an uplink reference signal.

The uplink reference signal contains N sounding reference signal (SRS) resource groups, where N is an integer greater than or equal to 1. An i-th SRS resource group contains $M_i$ SRS resources, where $M_i$ is an integer greater than or equal to 1. SRS resources from different SRS resource groups may be sent simultaneously. The SRS resources from the different SRS resource groups may have the same time domain behavior, such as periodic transmission, semi-persistent transmission or aperiodic transmission. Each SRS resource group is associated with one downlink reference signal, the downlink reference signal is used for acquiring the downlink channel information. The first communication node sends the uplink reference signal by using the downlink channel information, which means that the first communication node determines the precoding of each uplink sub-band of the uplink reference signal according to the downlink channel information, generates the uplink reference signal according to the precoding of each uplink sub-band of the uplink reference signal and sends the uplink reference signal. For example, as shown in FIG. 2 which is a schematic diagram of SRS resources of an uplink reference signal, the i-th SRS resource group and an (i+1)-th SRS resource group exist and contain the $M_i$ SRS resources and $M_{i+1}$ SRS resources, respectively, and a frequency domain range occupied by each SRS resource is shown in the figure. $w_{(k,i,j)}$ denotes precoding of a j-th SRS resource in the i-th SRS resource group on a k-th uplink sub-band. The UE calculates $w_{(k,i,j)}$ according to the downlink channel information acquired by the downlink reference signal associated with the i-th SRS resource group.

An association relationship between an SRS resource and a phase tracking reference signal (PTRS) port includes at least one of the following manners: all SRS resources are associated with no PTRS ports, or each SRS resource is associated with one PTRS port. The PTRS is used for tracking phase noise.

In S1030, downlink control signaling sent by the second communication node is monitored, where the downlink control signaling includes a sub-band SRS resource indication.

After the first communication node sends the uplink reference signal to the second communication node, the second communication node sends the downlink control signaling to the first communication node. The downlink control signaling is used for scheduling the uplink transmission channel of the first communication node and includes the sub-band SRS resource indication. The sub-band SRS resource indication is used for indicating the precoding of the sub-band of the uplink transmission channel, and the precoding used by the uplink transmission channel on a certain uplink sub-band is determined by a sub-band SRS resource indication corresponding to the uplink sub-band.

A division manner of the uplink sub-band includes at least one of the methods described below.

Division is performed according to a bandwidth of a carrier component where the uplink transmission channel is located and a size of sub-band division granularity.

Division is performed according to a frequency domain range of a bandwidth part (BWP) where the uplink transmission channel is located and a size of sub-band division granularity.

Division is performed according to a frequency domain range of the SRS resource and a size of sub-band division granularity.

The size of sub-band division granularity is indicated in at least one of the following manners: higher layer signaling, physical layer signaling, the bandwidth of the carrier component where the uplink transmission channel is located, the frequency domain range of the BWP where the uplink transmission channel is located or the frequency domain range of the SRS resource. The higher layer signaling is, for example, radio resource control (RRC) signaling or media access control control element (MAC CE) signaling, and the physical layer signaling is, for example, downlink control information (DCI).

Figure 3:
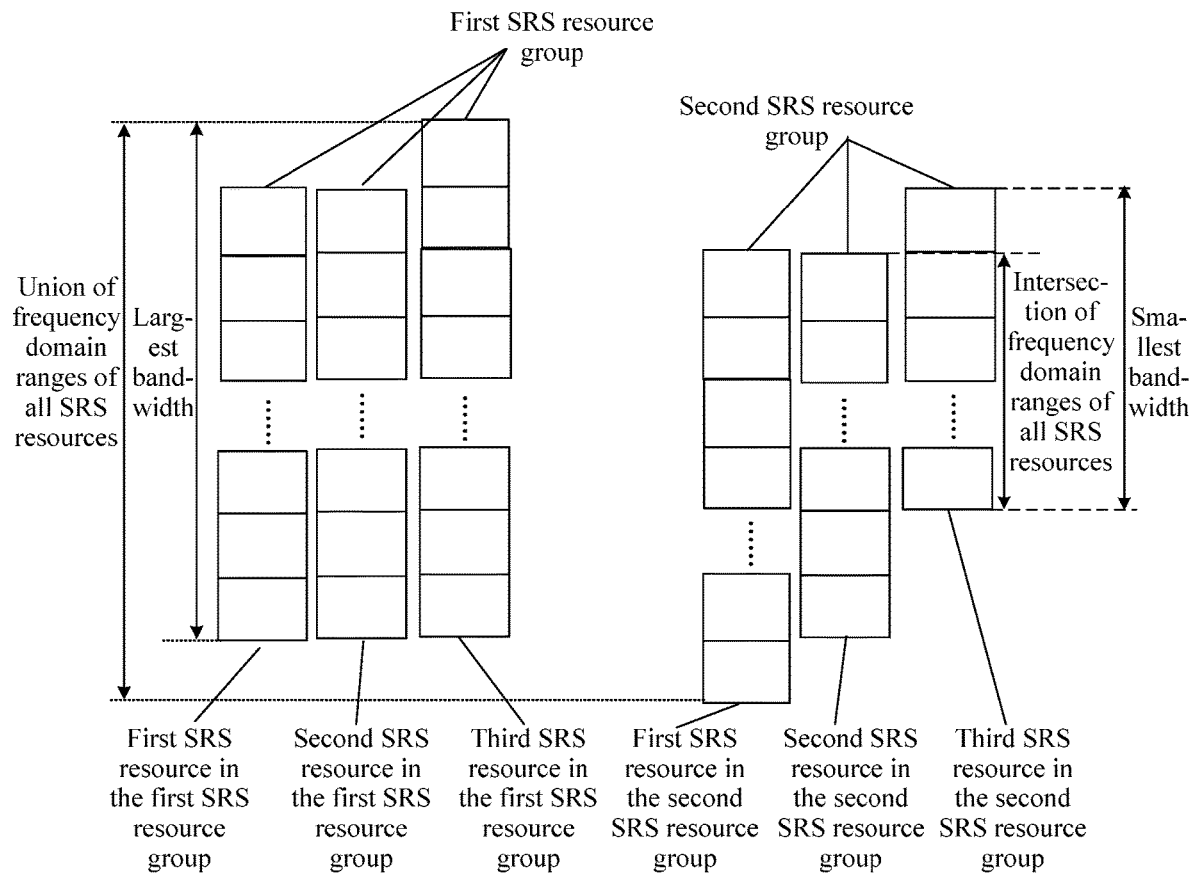
FIG. 3 is a schematic diagram of a sub-band division of SRS resources.

For a determination manner according to the frequency domain range of the SRS resource and the size of sub-band division granularity, a specific example is shown in FIG. 3.

FIG. 3 is a schematic diagram of a sub-band division of SRS resources. Assuming that two SRS resource groups exist and each SRS resource group has three SRS resources, the division manner of the uplink sub-band may include one of the manners described below.

(1) Division is performed according to an SRS resource with a largest bandwidth among all the SRS resources and the sub-band division granularity.

(2) Division is performed according to a union of frequency domain ranges of all the SRS resources and the sub-band division granularity.

(3) Division is performed according to an SRS resource with a smallest bandwidth among all the SRS resources and the sub-band division granularity.

(4) Division is performed according to an intersection of frequency domain ranges of all the SRS resources and the sub-band division granularity.

The uplink transmission channel is scheduled by the downlink control signaling in any one of the manners described below.

One DCI is used for scheduling the uplink transmission channel.

Two DCIs are used for independently scheduling the uplink transmission channel.

Two DCIs are used for jointly scheduling the uplink transmission channel.

In S1040, the uplink transmission channel is sent according to scheduling of the downlink control signaling.

After successfully monitoring the downlink control signaling, the first communication node may send the uplink transmission channel according to the scheduling of the downlink control signaling. Since the downlink control signaling includes the sub-band SRS resource indication, the first communication node may determine the precoding of the uplink transmission channel required to be transmitted according to the sub-band SRS resource indication in the downlink control signaling and send the uplink transmission channel.

The uplink transmission method provided in the present embodiment is applied to the first communication node. After the downlink reference signal sent by the second communication node is received, the downlink channel information is acquired. Then, the uplink reference signal is sent by using the downlink channel information. When the downlink control signaling sent by the second communication node is successfully monitored, where the downlink control signaling includes the sub-band SRS resource indication, the uplink transmission channel is sent according to the scheduling of the downlink control signaling. In this manner, the precoding information of the uplink transmission channel can be calculated by using the downlink channel information when the uplink transmission channel and the downlink transmission channel have the reciprocity, which improves channel estimation accuracy and is conducive to enhancing the uplink transmission.

In an embodiment, the downlink control signaling for scheduling the uplink transmission channel includes the one DCI for scheduling the uplink transmission channel, and the one DCI for scheduling the uplink transmission channel contains the sub-band SRS resource indication. Specifically, the downlink control signaling contains at least one of the following information: a carrier indication, a BWP indication, frequency domain resource allocation, time domain resource allocation, a frequency hopping indication, a frequency hopping offset indication, a modulation and coding scheme, a redundancy version, a process number, multiple sub-band SRS resource indications, a wideband SRS resource indication, an indication of the number of transmission layers, an SRS resource group indication, a demodulation reference signal (DMRS) port indication or a DMRS sequence initialization indication. The multiple sub-band SRS resource indications are used for indicating the precoding of the uplink transmission channel, and the precoding used by the uplink transmission channel on a certain uplink sub-band is determined by the sub-band SRS resource indication corresponding to the uplink sub-band. In the case of no conflict, the downlink control signaling including the one DCI may be implemented by the same method as the downlink control signaling including the two DCIs for jointly scheduling the uplink transmission channel.

In an embodiment, the downlink control signaling for scheduling the uplink transmission channel includes the two DCIs for independently scheduling the uplink transmission channel. Frequency domain ranges indicated by the two DCIs for independently scheduling the uplink transmission channel do not overlap and each of the two DCIs for independently scheduling the uplink transmission channel contains the sub-band SRS resource indication. Specifically, each downlink control signaling contains at least one of the following information: the carrier indication, the BWP indication, the frequency domain resource allocation, the time domain resource allocation, the frequency hopping indication, the frequency hopping offset indication, the modulation and coding scheme, the redundancy version, the process number, the multiple sub-band SRS resource indications, the wideband SRS resource indication, the indication of the number of transmission layers, the SRS resource group indication, the DMRS port indication or the DMRS sequence initialization indication. The multiple sub-band SRS resource indications are used for indicating the precoding of the uplink transmission channel, and the precoding used by the uplink transmission channel on a certain uplink sub-band is determined by the sub-band SRS resource indication corresponding to the uplink sub-band. In the case of no conflict, the downlink control signaling including the two DCIs for independently scheduling the uplink transmission channel may be implemented by the same method as the downlink control signaling including the two DCIs for jointly scheduling the uplink transmission channel.

In an embodiment, the downlink control signaling for scheduling the uplink transmission channel includes the two DCIs for jointly scheduling the uplink transmission channel. The two DCIs for jointly scheduling the uplink transmission channel include first DCI and second DCI by which the uplink transmission channel is jointly scheduled.

The first DCI includes at least one of the following information: the carrier indication, the BWP indication, the frequency domain resource allocation, the time domain resource allocation, the frequency hopping indication, the frequency hopping offset indication, the modulation and coding scheme, the redundancy version, the process number, an SRS resource indication, the SRS resource group indication, the indication of the number of transmission layers, the DMRS port indication, the DMRS sequence initialization indication or an indication of a size of the second DCI. The second DCI includes at least one of the following information: a plurality of uplink sub-band numbers, the multiple sub-band SRS resource indications, the modulation and coding scheme, the redundancy version, a redundancy version offset, the DMRS sequence initialization indication or a DMRS sequence initialization offset indication. The DMRS is used for demodulation of the uplink transmission channel.

The first communication node determines whether the second DCI exists in at least one of the following manners: the RRC signaling configured by the base station, the MAC CE signaling configured by the base station or prompt information in the first DCI. The prompt information in the first DCI includes at least one of the following manners: a scrambling code of the first DCI, the redundancy version in the first DCI, the SRS resource indication in the first DCI, the SRS resource group indication in the first DCI or the DMRS sequence initialization indication in the first DCI. The scrambling code of the first DCI, for example, a radio network temporary identifier (RNTI) of the first DCI, refers to that a cyclic redundancy check (CRC) bit of the first DCI is scrambled using a specific RNTI so that a terminal is notified of whether the second DCI exists. The DMRS sequence initialization indication in the first DCI refers to that the base station notifies the terminal of whether the second DCI exists through the DMRS sequence initialization indication.

A size of information bits of the second DCI is determined in at least one of the following manners: the indication of the size of the second DCI in the first DCI, the association relationship between the SRS resource and the PTRS port, the number of SRS resource groups, the number of SRS resources contained in each SRS resource group, a selection of an SRS resource group, the number of SRS resources contained in each uplink sub-band, the frequency hopping indication in the first DCI, the frequency hopping offset indication in the first DCI, the SRS resource indication in the first DCI or the frequency domain resource allocation in the first DCI. A bit width of each sub-band SRS resource indication is determined by at least one of the following information: the association relationship between the SRS resource and the PTRS port, the number of SRS resource groups, the number of SRS resources contained in each SRS resource group, the selection of the SRS resource group, the SRS resource indication in the first DCI or the number of SRS resources contained in each uplink sub-band.

The number of layers of the uplink transmission channel is determined by at least one of the following information: the SRS resource indication in the first DCI, the indication of the number of transmission layers in the first DCI, the DMRS port indication in the first DCI or the multiple sub-band SRS resource indications in the second DCI.

The multiple uplink sub-band numbers are determined by at least one of the following information: the division manner of the uplink sub-band, the frequency hopping indication in the first DCI, the frequency hopping offset indication in the first DCI or the frequency domain resource allocation in the first DCI.

A relationship between the multiple uplink sub-band numbers and the multiple sub-band SRS resource indications in the second DCI may include at least one of the manners described below.

The second DCI contains no uplink sub-band numbers and contains only the multiple sub-band SRS resource indications.

The second DCI contains the multiple uplink sub-band numbers and the multiple sub-band SRS resource indications, where one of the multiple uplink sub-band numbers corresponds to one of the multiple sub-band SRS resource indications.

The second DCI contains the multiple uplink sub-band numbers and the multiple sub-band SRS resource indications, where one group of uplink sub-band numbers among the plurality of uplink sub-band numbers corresponds to one of the multiple sub-band SRS resource indications.

The sub-band SRS resource indication is used for indicating the precoding of the uplink transmission channel, and the precoding used by the uplink transmission channel on a certain uplink sub-band is determined by the sub-band SRS resource indication corresponding to the uplink sub-band.

Figure 4:
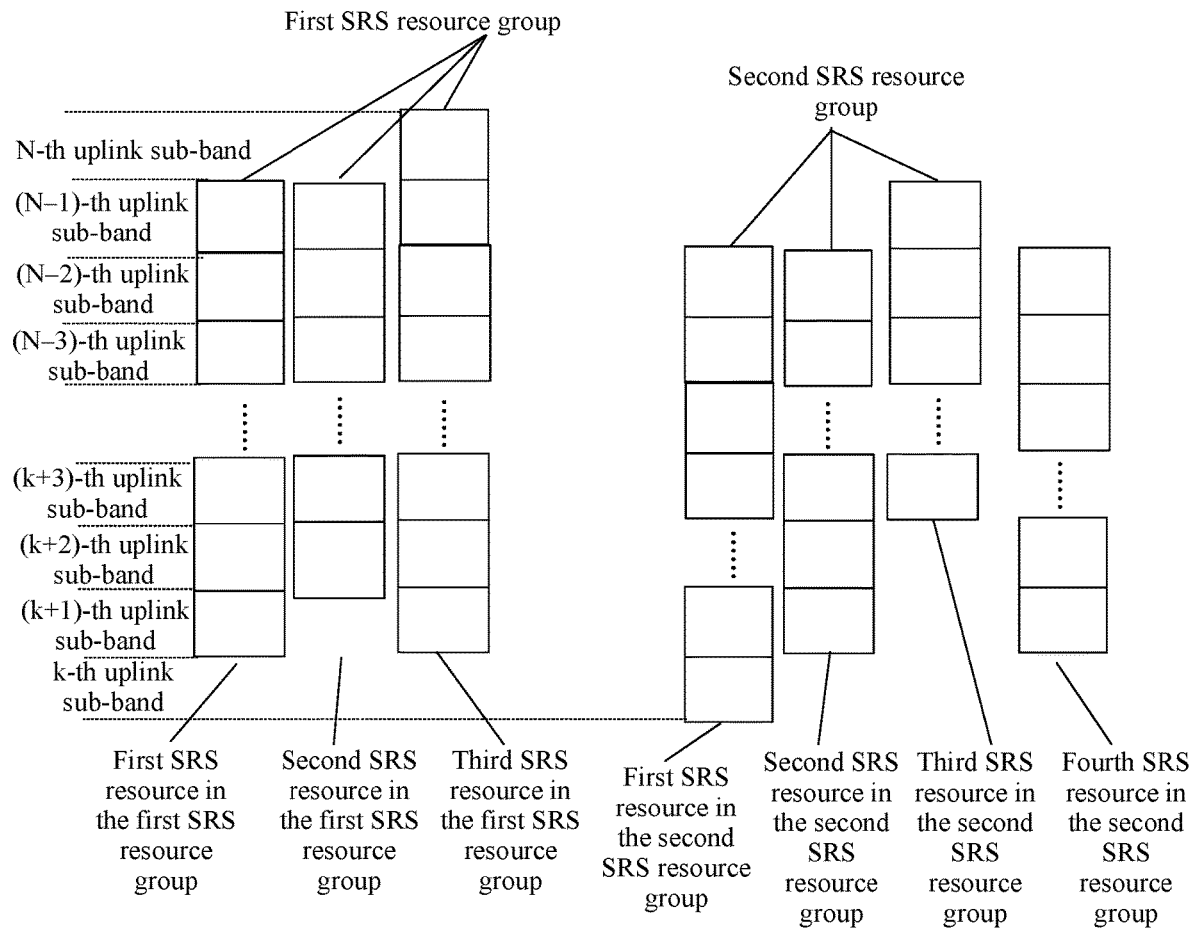
FIG. 4 is a schematic diagram of a selection of an SRS resource group.

The number of SRS resources contained in each uplink sub-band refers to the number of SRS resources within a frequency domain range occupied by the each uplink sub-band and is related to the selection of the SRS resource group. A relationship between the number of SRS resources contained in each uplink sub-band and a total number of SRS resources affects the SRS resource indication in the first DCI and the sub-band SRS resource indications in the second DCI. The total number of SRS resources is determined in at least one of the following manners: a total number of SRS resources contained in all the SRS resource groups; or the total number of SRS resources is related to the selection of the SRS resource group and refers to a total number of SRS resources contained in the selected SRS resource group. For example, as shown in FIG. 4 which is a schematic diagram of a selection of an SRS resource group, it is assumed that two SRS resource groups exist, where a first SRS resource group contains three SRS resources and a second SRS resource group contains four SRS resources. If the first SRS resource group is selected, the total number of SRS resources is 3, and two SRS resources are contained in a (k+1)-th uplink sub-band. If the second SRS resource group is selected, the total number of SRS resources is 4, and three SRS resources are contained in the (k+1)-th uplink sub-band. If the first SRS resource group and the second SRS resource group are selected, the total number of SRS resources is 7, and five SRS resources are contained in the (k+1)-th uplink sub-band.

The number of SRS resources contained in each uplink sub-band is the number of SRS resources within a frequency domain range occupied by the corresponding uplink sub-band. The relationship between the number of SRS resources contained in each uplink sub-band and the total number of SRS resources may include one of the limitations described below.

If all the SRS resources are configured to occupy the same frequency domain range, the number of SRS resources contained in each uplink sub-band is the same as the total number of SRS resources. Different SRS resources may occupy different frequency domain ranges, and the division manner of the uplink sub-band ensures that the number of SRS resources contained in each uplink sub-band is the same as the total number of SRS resources. An uplink sub-band that contains SRS resources whose number is smaller than the total number of SRS resources cannot be used for scheduling the uplink transmission channel. No corresponding sub-band SRS resource indication exists for an uplink sub-band which contains SRS resources whose number is smaller than the total number of SRS resources. An uplink sub-band that contains SRS resources whose number is smaller than the total number of SRS resources may be used for scheduling the uplink transmission channel, and a corresponding sub-band SRS resource indication exists for the uplink sub-band.

For the operation of monitoring the control signaling from the second communication node, in the case where the first communication node fails to monitor the second DCI, the uplink transmission channel uses information indicated by the first DCI. In the case where the second DCI exists and the first communication node successfully monitors the second DCI, the uplink transmission channel uses information indicated jointly by the two DCIs. The first communication node determines that the two DCIs each are successfully monitored by the first communication node in at least one of the manners described below.

The uplink transmission channel uses the modulation and coding scheme indicated by the second DCI. The uplink transmission channel uses the redundancy version indicated by the second DCI. A redundancy version of the uplink transmission channel is jointly determined by the redundancy version indicated by the first DCI and the redundancy version offset indicated by the second DCI. DMRS sequence initialization of the uplink transmission channel uses the DMRS sequence initialization indication in the second DCI. DMRS sequence initialization of the uplink transmission channel is jointly determined by DMRS sequence initialization indicated by the first DCI and a DMRS sequence initialization offset indicated by the second DCI.

The downlink control signaling including the two DCIs for jointly scheduling the uplink transmission channel is implemented in a specific manner described below. The two DCIs for jointly scheduling the uplink transmission channel in different cases are described below in detail through embodiments.

Figure 5:
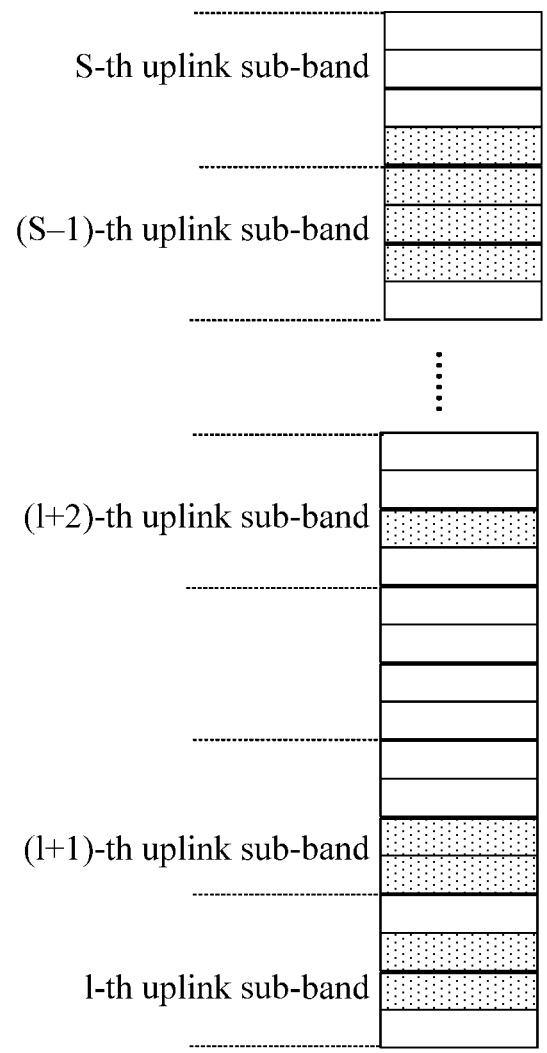
FIG. 5 is a schematic diagram of a frequency domain range of an uplink transmission channel scheduled by first DCI.

In an embodiment, it is assumed that only one SRS resource group exists, where the SRS resource group contains M SRS resources and all the SRS resources are associated with no PTRS port. In the present embodiment, it is assumed that M=4. The first DCI does not indicate frequency hopping. Part of the frequency domain range of the uplink transmission channel scheduled by the first DCI is shown by the black part in FIG. 5. FIG. 5 is a schematic diagram of the frequency domain range of the uplink transmission channel scheduled by the first DCI. In the present embodiment, it is assumed that granularity of one uplink sub-band is four resource blocks (RB).

The SRS resource indication in the first DCI may use one of the following manners: a bitmap or joint encoding.

In a specific example, if the SRS resource indication in the first DCI is 1010 and the number of layers of the uplink transmission channel is determined by the SRS resource indication in the first DCI, it indicates that the number of layers of the uplink transmission channel is 2 and a first SRS resource and a third SRS resource in the SRS resource group are selected. In the present embodiment, it is assumed that the second DCI exists, where the second DCI includes the multiple sub-band SRS resource indications and the number of SRS resources selected by each sub-band SRS resource indication must be the same as the number of SRS resources selected by the SRS resource indication in the first DCI. Specifically, one of the following manners may be used.

Manner one: the second DCI does not contain the multiple uplink sub-band numbers and contains only the multiple sub-band SRS resource indications. As shown in FIG. 5, if at least one RB contained in a certain uplink sub-band is scheduled for the uplink transmission, the uplink sub-band corresponds to one sub-band SRS resource indication. The sub-band SRS resource indication may use one of the following manners: the bitmap or the joint encoding. In a specific example where the bitmap is used, sub-band SRS resource indications of an l-th sub-band and an (l+1)-th sub-band are 0110 and 1001, respectively. The preceding sub-band SRS resource indications indicate that in an l-th sub-band in a first layer of the uplink transmission channel, precoding used by a scheduled frequency domain resource is based on precoding in the corresponding uplink sub-band and used for sending a second SRS resource; in an l-th sub-band in a second layer of the uplink transmission channel, precoding used by a scheduled frequency domain resource is based on precoding in the corresponding uplink sub-band and used for sending a third SRS resource; in an (l+1)-th sub-band in the first layer of the uplink transmission channel, precoding used by a scheduled frequency domain resource is based on precoding in the corresponding uplink sub-band and used for sending a first SRS resource; and in an (l+1)-th sub-band in the second layer of the uplink transmission channel, precoding used by a scheduled frequency domain resource is based on precoding in the corresponding uplink sub-band and used for sending a fourth SRS resource.

Another implementation is that at least one RB is used for part uplink sub-bands of the uplink transmission channel, which may correspond to the same sub-band SRS resource indication so that an overhead of the second DCI is reduced. In a specific example, as shown in FIG. 5, three RBs in an (S−1)-th unlink sub-band are scheduled, one RB in an S-th unlink sub-band is scheduled, and the four RBs are consecutive. In order to reduce the overhead of the second DCI, the S-th uplink sub-band and the (S−1)-th uplink sub-band correspond to the same sub-band SRS resource indication.

In addition, at least one RB is used for some uplink sub-bands of the uplink transmission channel, which may not correspond to any sub-band SRS resource indication. In this case, these uplink sub-bands use the SRS resource indication in the first DCI by default so that the overhead of the second DCI is reduced.

Manner two: the second DCI contains the multiple uplink sub-band numbers and the multiple sub-band SRS resource indications, where one of the multiple uplink sub-band numbers corresponds to one of the multiple sub-band SRS resource indications. The multiple uplink sub-band numbers are jointly determined by the division manner of the uplink sub-band and the frequency domain range of the uplink transmission channel. In a specific example, as shown in FIG. 5, an (l+1)-th uplink sub-band and an (S−1)-th uplink sub-band each contain at least one RB indicated to be used for the uplink transmission channel. The two uplink sub-bands are renumbered by p and q, respectively. The sub-band SRS resource indication may use one of the following manners: the bitmap or the joint encoding. In a specific example where the bitmap is used, sub-band SRS resource indications of the uplink sub-bands numbered p and q are 0110 and 1001, respectively. The preceding sub-band SRS resource indications indicate that in a sub-band numbered p in a first layer of the uplink transmission channel, precoding used by a scheduled frequency domain resource is based on precoding in the corresponding uplink sub-band and used for sending a second SRS resource; in a sub-band numbered p in a second layer of the uplink transmission channel, precoding used by a scheduled frequency domain resource is based on precoding in the corresponding uplink sub-band and used for sending a third SRS resource; in a sub-band numbered q in the first layer of the uplink transmission channel, precoding used by a scheduled frequency domain resource is based on precoding in the corresponding uplink sub-band and used for sending a first SRS resource; and in a sub-band numbered q in the second layer of the uplink transmission channel, precoding used by a scheduled frequency domain resource is based on precoding in the corresponding uplink sub-band and used for sending a fourth SRS resource.

Another implementation is that at least one RB is used for part uplink sub-bands of the uplink transmission channel, which may correspond to the same uplink sub-band number so that an overhead of the second DCI is reduced. In a specific example, as shown in FIG. 5, three RBs in the (S−1)-th unlink sub-band are scheduled, one RB in an S-th unlink sub-band is scheduled, and the four RBs are consecutive. In order to reduce the overhead of the second DCI, the S-th uplink sub-band and the (S−1)-th uplink sub-band correspond to the same uplink sub-band number.

In addition, not all uplink sub-band numbers must each correspond to one sub-band SRS resource indication. When some uplink sub-band numbers do not correspond to any sub-band SRS resource indication, the SRS resource indication in the first DCI is used by default so that the overhead of the second DCI is reduced.

Manner three: the second DCI contains the multiple uplink sub-band numbers and the multiple sub-band SRS resource indications, where one group of uplink sub-band numbers among the plurality of uplink sub-band numbers corresponds to one of the multiple sub-band SRS resource indications. The multiple uplink sub-band numbers are jointly determined by the division manner of the uplink sub-band and the frequency domain range of the uplink transmission channel. As shown in FIG. 5, an (l+1)-th uplink sub-band and an (S−1)-th uplink sub-band each contain at least one RB indicated to be used for the uplink transmission channel. The two uplink sub-bands are renumbered by p and q, respectively. The sub-band SRS resource indication may use one of the following manners: the bitmap or the joint encoding. One group of uplink sub-band numbers among the plurality of uplink sub-band numbers corresponds to one sub-band SRS resource indication. In a specific example, the uplink sub-bands numbered p and q correspond to the same sub-band SRS resource indication 0101. The preceding sub-band SRS resource indication indicates that in the sub-band numbered p of the uplink transmission channel, precoding used by a scheduled frequency domain resource in a first layer is based on precoding in the corresponding uplink sub-band and used for sending a second SRS resource; in the sub-band numbered p of the uplink transmission channel, precoding used by a scheduled frequency domain resource in a second layer is based on precoding in the corresponding uplink sub-band and used for sending a fourth SRS resource; in the sub-band numbered q of the uplink transmission channel, precoding in the first layer and used by a scheduled frequency domain resource is based on precoding in the corresponding uplink sub-band and used for sending a second SRS resource; and in the sub-band numbered q of the uplink transmission channel, precoding in the second layer and used by a scheduled frequency domain resource is based on precoding in the corresponding uplink sub-band and used for sending a fourth SRS resource.

Another implementation is that at least one RB is used for part uplink sub-bands of the uplink transmission channel, and multiple uplink sub-bands may correspond to the same uplink sub-band number so that an overhead of the second DCI is reduced. In a specific example, as shown in FIG. 5, three RBs in the (S−1)-th unlink sub-band are scheduled, one RB in an S-th unlink sub-band is scheduled, and the four RBs are consecutive. In order to reduce the overhead of the second DCI, the S-th uplink sub-band and the (S−1)-th uplink sub-band correspond to the same uplink sub-band number.

In addition, not all uplink sub-band numbers must each correspond to one sub-band SRS resource indication. When some uplink sub-band numbers do not correspond to any sub-band SRS resource indication, the SRS resource indication in the first DCI is used by default so that the overhead of the second DCI is reduced.

In addition, an example where the number of layers of the uplink transmission channel is determined is provided. It is assumed that three DMRS ports are selected by the DMRS port indication in the first DCI and the SRS resource indication in the first DCI is 1000. If the second DCI does not exist or fails to be monitored, the number of layers of the uplink transmission channel is determined by the SRS resource indication in the first DCI to be 1. A first SRS resource in the SRS resource group is selected, and a DMRS port used by the uplink transmission channel is one of the DMRS ports based on the DMRS port indication in the first DCI. If the second DCI exists and is successfully monitored, the number of layers of the uplink transmission channel may be determined in one of the following manners: the number of DMRS ports based on a first DMRS port indication or the multiple sub-band SRS resource indications in the second DCI. The number of layers of the uplink transmission channel is determined by the number of DMRS ports based on the first DMRS port indication. If the number of transmission layers in the preceding example is 3, each sub-band SRS resource indication in the second DCI must indicate three SRS resources, and the DMRS ports used by the uplink transmission channel are all the DMRS ports based on the DMRS port indication in the first DCI. The number of layers of the uplink transmission channel is determined by the multiple sub-band SRS resource indications in the second DCI. For example, if each sub-band SRS resource indication in the second DCI indicates two SRS resources, it indicates that the number of layers of the uplink transmission channel is 2 and DMRS ports in the two layers of the uplink transmission channel correspond to two of the DMRS ports based on the DMRS port indication in the first DCI, respectively.

In another embodiment, one SRS resource group exists, and each SRS resource is associated with one PTRS port. Different uplink sub-bands in the same layer of the uplink transmission channel must be associated with the same PTRS port. A selection of the PTRS port of the uplink transmission channel may be determined in one of the following manners: being determined by the SRS resource indication in the first DCI, being jointly determined by the SRS resource indication in the first DCI and a second sub-band SRS resource indication, or being determined by the sub-band SRS resource indications in the second DCI.

The selection of the PTRS port for the uplink transmission is determined by the SRS resource indication in the first DCI. For example, it is assumed that one SRS resource group includes four SRS resources, a first SRS resource and a second SRS resource are associated with a PTRS port 0, a third SRS resource and a fourth SRS resource are associated with a PTRS port 1, and the number of layers of the uplink transmission channel is determined by the SRS resource indication in the first DCI. Examples are described below.

(1) If the SRS resource indication in the first DCI is 1000, the first layer of the uplink transmission channel is associated with the PTRS port 0. Since the different uplink sub-bands in the same layer of the uplink transmission channel must be associated with the same PTRS port, each sub-band SRS resource indication can only select one SRS resource from the first SRS resource and the second SRS resource. In this case, the bit width of each sub-band SRS resource indication in the second DCI requires only one bit.

(2) If the SRS resource indication in the first DCI is 0011, the first layer and the second layer of the uplink transmission channel are associated with the same PTRS port 1. Since the different uplink sub-bands in the same layer of the uplink transmission channel must be associated with the same PTRS port, the second DCI does not exist in this case.

(3) If the SRS resource indication in the first DCI is 0110, the first layer and the second layer of the uplink transmission channel are associated with the PTRS port 0 and the PTRS port 1, respectively. In this case, if the second DCI exists, the sub-band SRS resource indication for the first layer of the uplink transmission can only select one SRS resource from the first SRS resource and the second SRS resource, and the sub-band SRS resource indication for the second layer of the uplink transmission can only select one SRS resource from the third SRS resource and the fourth SRS resource. In this case, the bit width of each sub-band SRS resource indication in the second DCI requires only two bits.

(4) If the SRS resource indication in the first DCI is 1110, the first layer and the second layer of the uplink transmission channel are associated with the same PTRS port 0, and a third layer is associated with the PTRS port 1. In this case, each sub-band SRS resource indication can only select one SRS resource from the third SRS resource and the fourth SRS resource for transmission of the third layer. The bit width of each sub-band SRS resource indication in the second DCI requires only one bit.

The selection of the PTRS port for the uplink transmission is jointly determined by the SRS resource indication in the first DCI and the sub-band SRS resource indications in the second DCI. In a specific example, it is assumed that one SRS resource group includes four SRS resources, a first SRS resource and a second SRS resource are associated with a PTRS port 0, a third SRS resource and a fourth SRS resource are associated with a PTRS port 1, and the number of layers of the uplink transmission channel is determined by the SRS resource indication in the first DCI. Examples are described below.

(1) If the SRS resource indication in the first DCI is 1000/0100/0010/0001, it indicates that the number of layers of the uplink transmission channel is 1 and each sub-band SRS resource indication in the second DCI can only indicate one SRS resource. Specifically, one of the following manners may be selected: all the sub-band SRS resource indications can only select one SRS resource from the first SRS resource and the second SRS resource; or all the sub-band SRS resource indications can only select one SRS resource from the third SRS resource and the fourth SRS resource. In a more specific example, a sub-band SRS resource indication for a smallest uplink sub-band number is 0100, which indicates that the first layer of the uplink transmission channel is associated with the PTRS port 0, and all the remaining sub-band SRS resource indications can only select one SRS resource from the first SRS resource and the second SRS resource. At this time, each of the remaining sub-band SRS resource indications requires only one bit.

(2) If the SRS resource indication in the first DCI is 1100/0011, it indicates that the number of layers of the uplink transmission channel is 2 and each sub-band SRS resource indication in the second DCI can only indicate two SRS resources. Each sub-band SRS resource indication can select any two SRS resources from the four SRS resources, which needs to satisfy that the different uplink sub-bands in the same layer of the uplink transmission channel must be associated with the same PTRS port.

(3) If the SRS resource indication in the first DCI is 1110/1101/1011/0111, it indicates that the number of layers of the uplink transmission channel is 3 and each sub-band SRS resource indication in the second DCI can only indicate three SRS resources. Each sub-band SRS resource indication can select any three SRS resources from the four SRS resources, which needs to satisfy that the different uplink sub-bands in the same layer of the uplink transmission channel must be associated with the same PTRS port.

(4) If the SRS resource indication in the first DCI is 1111, it indicates that the number of layers of the uplink transmission channel is 4. In this case, the second DCI does not exist.

Remaining implementation methods, if not in conflict with other embodiments, may be implemented by the same methods.

In another embodiment, the N SRS resource groups exist, where the i-th SRS resource group contains $M_i$ SRS resources.

The sub-band SRS resource indications in the second DCI may have one of the limitations described below.

The multiple sub-band SRS resource indications must select the same number of SRS resources from the same resource group; or the multiple sub-band SRS resource indications may select different numbers of SRS resources from the same resource group.

The selection of the SRS resource group may be determined in one of the manners described below.

The selection of the SRS resource group is indicated by a higher layer parameter.

The selection of the SRS resource group is indicated by the selection of the SRS resource group in the first DCI.

The selection of the SRS resource group is implicitly notified by the SRS resource indication in the first DCI.

If the selection of the SRS resource group is indicated by the higher layer parameter or the selection of the SRS resource group in the first DCI and all the SRS resources are associated with no PTRS port, a bit width of the SRS resource indication in the first DCI and the bit width of one sub-band SRS resource indication in the second DCI may be one of the cases described below.

(1) Only one SRS resource group can be selected

A: If different SRS resource groups have the same number of SRS resources, that is, $M_1=M_2=\ldots=M_N$, the bit width of the SRS resource indication in the first DCI is $$\left\lceil \log_2\left(\sum_{k=1}^{\min\{L_{max},M_1\}} \binom{M_1}{k}\right) \right\rceil,$$

where $L_{max}$ denotes a maximum number of layers that the terminal can support or a maximum number of transmission layers that the base station allows the terminal to support. Assuming that the first DCI indicates RI SRS resources, the bit width of one sub-band SRS resource indication in the second DCI is one of the following manners: $M_1$ bits or $$\left\lceil \log_2\left(\binom{M_1}{RI}\right) \right\rceil \text{ bits}.$$

B: If different SRS resource groups have different numbers of SRS resources, the bit width of the SRS resource indication in the first DCI is one of the following manners: $\max\{M_1, M_2, \ldots, M_N\}$ bits or $$\left\lceil \log_2\left(\sum_{k=1}^{\min\{L_{max},\max\{M_1,M_2,\ldots M_N\}\}} \binom{\max\{M_1, M_2, \ldots M_N\}}{k}\right) \right\rceil \text{ bits}.$$

$L_{max}$ denotes a maximum number of layers that the terminal can support or a maximum number of transmission layers that the base station allows the terminal to support. Assuming that the first DCI indicates RI SRS resources and selects an x-th ($x \in \{1, 2, \ldots, N\}$) SRS resource group, the bit width of one sub-band SRS resource indication in the second DCI is one of the following manners: $M_x$ bits or $$\left\lceil \log_2\left(\binom{M_x}{RI}\right) \right\rceil \text{ bits.}$$

(2) Multiple SRS resource groups can be selected. It is assumed that P (P≤N) SRS resource groups are selected, which correspond to $Q_1, Q_2, \ldots, Q_P$-th SRS resource groups, respectively. The bit width of the SRS resource indication in the first DCI is one of the following manners:

$$(M_{Q_1} + M_{Q_2} + \ldots + M_{Q_P}) \text{ bits,}$$

$$\left\lceil \log_2\left( \sum_{k=1}^{\min\{L_{max,Q_1}, M_{Q_1}\}} \binom{M_{Q_1}}{k} \right) \right\rceil + \log_2\left( \sum_{k=1}^{\min\{L_{max,Q_2}, M_{Q_2}\}} \binom{M_{Q_2}}{k} \right) +$$

$$\ldots + \log_2\left( \sum_{k=1}^{\min\{L_{max,Q_P}, M_{Q_P}\}} \binom{M_{Q_P}}{k} \right) \right\rceil \text{ bits or}$$

$$\left\lceil \log_2\left( \sum_{k=1}^{\min\{L_{max}, M_{Q_1}+M_{Q_2}+\ldots+M_{Q_P}\}} \binom{M_{Q_1}+M_{Q_2}+\ldots+M_{Q_P}}{k} \right) \right\rceil \text{ bits.}$$

$L_{max,Q_j}$ (j=1, 2, . . . , P) denotes a maximum number of layers that the terminal can support using an i-th antenna port group or a maximum number of transmission layers that the base station allows the terminal to support using the i-th antenna port group. $L_{max}$ denotes a maximum number of layers that the terminal can support or a maximum number of transmission layers that the base station allows the terminal to support. Assuming that the first DCI indicates $RI_{Q_j}$ (j=1, 2, . . . , P) SRS resources in a $Q_j$-th SRS resource group, the bit width of one sub-band SRS resource indication in the second DCI is one of the following: ($M_{Q_1}$+ $M_{Q_2}$+ . . . +$M_{Q_P}$) bits, $$\left\lceil \log_2\left(\binom{M_{Q_1}+M_{Q_2}+\ldots+M_{Q_P}}{RI}\right) \right\rceil \text{ bits or}$$

$$\left\lceil \log_2\left(\binom{M_{Q_1}}{RI_{Q_1}}\right) + \log_2\left(\binom{M_{Q_2}}{RI_{Q_2}}\right) + \ldots + \log_2\left(\binom{M_{Q_P}}{RI_{Q_P}}\right) \right\rceil \text{ bits.}$$

The selection of the SRS resource group is implicitly notified by the SRS resource indication in the first DCI, which means that whether a certain SRS resource group is selected is determined according to whether the SRS resource indication in the first DCI indicates at least one SRS resource in the SRS resource group. The bit width of the SRS resource indication in the first DCI may be one of the following:

$$(M_1 + M_2 + \ldots + M_N) \text{ bits,}$$

$$\left\lceil \log_2\left\{ \sum_{k=1}^{\min\{L_{max,1}, M_1\}} \binom{M_1}{k} \right\} + \right.$$

$$\left. \log_2\left( \sum_{k=1}^{\min\{L_{max,2}, M_2\}} \binom{M_2}{k} \right) + \ldots + \log_2\left( \sum_{k=1}^{\min\{L_{max,N}, M_N\}} \binom{M_N}{k} \right) \right\rceil \text{ bits or}$$

$$\left\lceil \log_2\left( \sum_{k=1}^{\min\{L_{max}, M_1+M_2+\ldots+M_N\}} \binom{M_1+M_2+\ldots+M_N}{k} \right) \right\rceil \text{ bits.}$$

$L_{max,i}$ (i=1, 2, . . . , N) denotes a maximum number of layers that the terminal can support using an i-th antenna port group or a maximum number of transmission layers that the base station allows the terminal to support using the i-th antenna port group. $L_{max}$ denotes a maximum number of layers that the terminal can support or a maximum number of transmission layers that the base station allows the terminal to support. Assuming that the first DCI indicates RI SRS resources in total and indicates $RI_i$ (i=1, 2, . . . N) SRS resources in the i-th SRS resource group, the bit width of one sub-band SRS resource indication in the second DCI is one of the following manners:

$$(M_1 + M_2 + \ldots + M_N) \text{ bits,}$$

$$\left\lceil \log_2\left(\binom{M_1 + M_2 + \ldots + M_N}{RI}\right) \right\rceil \text{ bits or}$$

$$\left\lceil \log_2\left(\binom{M_1}{RI_1}\right) + \log_2\left(\binom{M_2}{RI_2}\right) + \ldots + \log_2\left(\binom{M_N}{RI_N}\right) \right\rceil \text{ bits.}$$

In another embodiment, the N SRS resource groups exist, and the SRS resource is associated with the PTRS port. The association relationship between the SRS resource and the PTRS port affects each sub-band SRS resource indication in the second DCI. The sub-band SRS resource indications in the second DCI have the following limitation: the different uplink sub-bands in the same layer of the uplink transmission channel must be associated with the same PTRS port. The association relationship between the SRS resource in one SRS resource group and the PTRS port has two cases described below.

Different SRS resources in one SRS resource group may be associated with different PTRS ports.

All SRS resources in one SRS resource group can only be associated with the same PTRS port.

The sub-band SRS resource indication in the second DCI may select SRS resources from different SRS resource groups as indicated in one of the manners described below.

The multiple sub-band SRS resource indications must select the same number of SRS resources from the same SRS resource group.

The multiple sub-band SRS resource indications may select different numbers of SRS resources from the same SRS resource group.

Different SRS resources in one SRS resource group may be associated with different PTRS ports, and the multiple sub-band SRS resource indications must select the same number of SRS resources from the same SRS resource group. In a specific example, it is assumed that two SRS resource groups exist and the selection of the PTRS port of the uplink transmission channel and the number of layers of the uplink transmission channel are determined by the SRS resource indication in the first DCI. The different uplink sub-bands in the same layer of the uplink transmission channel must be associated with the same PTRS port. Each SRS resource group contains four SRS resources. A first SRS resource and a second SRS resource in a first SRS resource group are associated with a PTRS port 0. A third SRS resource and a fourth SRS resource in the first SRS resource group are associated with a PTRS port 1. A first SRS resource and a second SRS resource in a second SRS resource group are associated with a PTRS port 2. A third SRS resource and a fourth SRS resource in the second SRS resource group are associated with a PTRS port 3. The SRS resource indication in the first DCI and the sub-band SRS resource indication in the second DCI are described in examples below.

(1) The SRS resource indication in the first DCI is 10000001, which indicates that the number of layers of the uplink transmission channel is 2, the first layer of the uplink transmission is associated with the PTRS port 0 and the second layer of the uplink transmission is associated with the PTRS port 3. The different uplink sub-bands in the same layer of the uplink transmission channel must be associated with the same PTRS port. Therefore, the sub-band SRS resource indication for the first layer can only select one SRS resource from the first SRS resource and the second SRS resource in the first SRS resource group, and the sub-band SRS resource indication for the second layer can only select one SRS resource from the third SRS resource and the fourth SRS resource in the second SRS resource group. In this case, the bit width of each sub-band SRS resource indication requires only two bits.

(2) The SRS resource indication in the first DCI is 11001001, which indicates that the number of layers of the uplink transmission channel is 4, the first layer and the second layer of the uplink transmission is associated with the PTRS port 0, the third layer of the uplink transmission is associated with the PTRS port 2, and a fourth layer of the uplink transmission is associated with the PTRS port 3. The different uplink sub-bands in the same layer of the uplink transmission channel must be associated with the same PTRS port. Therefore, the sub-band SRS no longer includes a selection from the first SRS resource group, the sub-band SRS resource indication for the third layer may select one SRS resource from the first SRS resource and the second SRS resource in the second SRS resource group, and the sub-band SRS resource indication for the fourth layer may be selected from one SRS resource from the third SRS resource and the fourth SRS resource in the second SRS resource group. In this case, the bit width of each sub-band SRS resource indication requires only two bits.

(3) The SRS resource indication in the first DCI is 11111111, which indicates that the number of layers of the uplink transmission channel is 8. All the SRS resources are selected, and the second DCI does not exist.

(4) The SRS resource indication in the first DCI is 11000000/00110000, which indicates that the number of layers of the uplink transmission channel is 2 and the second SRS resource group is not selected. The different uplink sub-bands in the same layer of the uplink transmission channel must be associated with the same PTRS port. Therefore, the second DCI does not exist in this case.

(5) The SRS resource indication in the first DCI is 00001100/00000011, which indicates that the number of layers of the uplink transmission channel is 2 and the first SRS resource group is not selected. The different uplink sub-bands in the same layer of the uplink transmission channel must be associated with the same PTRS port. Therefore, the second DCI does not exist in this case.

(6) The SRS resource indication in the first DCI is 11100000, which indicates that the number of layers of the uplink transmission channel is 3 and the second SRS resource group is not selected. The different uplink sub-bands in the same layer of the uplink transmission channel must be associated with the same PTRS port. The sub-band SRS resource indication for the third layer can only select one SRS resource from the third SRS resource and the fourth SRS resource in the first SRS resource group. In this case, each sub-band SRS resource indication requires only one bit.

(7) The SRS resource indication in the first DCI is 11110000/11001100/11000011/00111100/00110011/00001111, which indicates that the number of layers of the uplink transmission channel is 4. Since each sub-band SRS resource indication in the second DCI corresponds to an SRS resource indication for the same layer of the uplink transmission channel, the SRS resources locate in the same SRS resource group must be associated with the same PTRS port. In this case, the second DCI does not exist.

Different SRS resources in one SRS resource group can only be associated with the same PTRS port, and the multiple sub-band SRS resource indications must select the same number of SRS resources from the same SRS resource group. In a specific example, it is assumed that two SRS resource groups exist and the selection of the PTRS port of the uplink transmission channel and the number of layers of the uplink transmission channel are determined by the SRS resource indication in the first DCI. Each SRS resource group contains four SRS resources. The different uplink sub-bands in the same layer of the uplink transmission channel must be associated with the same PTRS port. All SRS resources in a first SRS resource group are associated with a PTRS port 0. All SRS resources in a second SRS resource group are associated with a PTRS port 1. The SRS resource indication in the first DCI and the sub-band SRS resource indication in the second DCI are described in examples below.

(1) The SRS resource indication in the first DCI is 10000001, which indicates that the number of layers of the uplink transmission channel is 2, the first layer of the uplink transmission is associated with the PTRS port 0, and the second layer of the uplink transmission is associated with the PTRS port 1. The sub-band SRS resource indication for the first layer can only select one SRS resource from the first SRS resource group, and the sub-band SRS resource indication for the second layer can only select one SRS resource from the second SRS resource group.

(2) The SRS resource indication in the first DCI is 11001001, which indicates that the number of layers of the uplink transmission channel is 4, the first layer and the second layer of the uplink transmission are associated with the PTRS port 0, and the third layer and the fourth layer of the uplink transmission are associated with the PTRS port 1. The sub-band SRS resource indication for the first layer and the second layer can only select two SRS resources from the first SRS resource group, and the sub-band SRS resource indication for the third layer and the fourth layer can only select two SRS resources from the second SRS resource group.

(3) The SRS resource indication in the first DCI is 11111111, which indicates that the number of layers of the uplink transmission channel is 8. All the SRS resources are selected, and the second DCI does not exist.

(4) The SRS resource indication in the first DCI is 11110000/00001111, which indicates that the number of layers of the uplink transmission channel is 4. In this case, the second DCI does not exist.

Different SRS resources in one SRS resource group can only be associated with the same PTRS port, and the multiple sub-band SRS resource indications may select different numbers of SRS resources from the same SRS resource group. In a specific example, it is assumed that two SRS resource groups exist and the selection of the PTRS port of the uplink transmission channel is jointly determined by the SRS resource indication in the first DCI and a second sub-band SRS resource indication. Each SRS resource group contains four SRS resources. All SRS resources in a first SRS resource group are associated with a PTRS port 0. All SRS resources in a second SRS resource group are associated with a PTRS port 1. The SRS resource indication in the first DCI and the sub-band SRS resource indication in the second DCI are described in examples below.

(1) The SRS resource indication in the first DCI is 10000001, which indicates that the number of layers of the uplink transmission channel is 2. Any sub-band SRS resource indication can select any two SRS resources from the eight SRS resources. A PTRS actually associated with the uplink transmission depends on the number of transmission layers and the sub-band SRS resource indication.

(2) The SRS resource indication in the first DCI is 11001001, which indicates that the number of layers of the uplink transmission channel is 4. Any sub-band SRS resource indication can select any four SRS resources from the eight SRS resources. A PTRS actually associated with the uplink transmission depends on the number of transmission layers and the sub-band SRS resource indication.

Remaining implementation methods, if not in conflict with other embodiments, may be implemented by the same methods.

Figure 6:
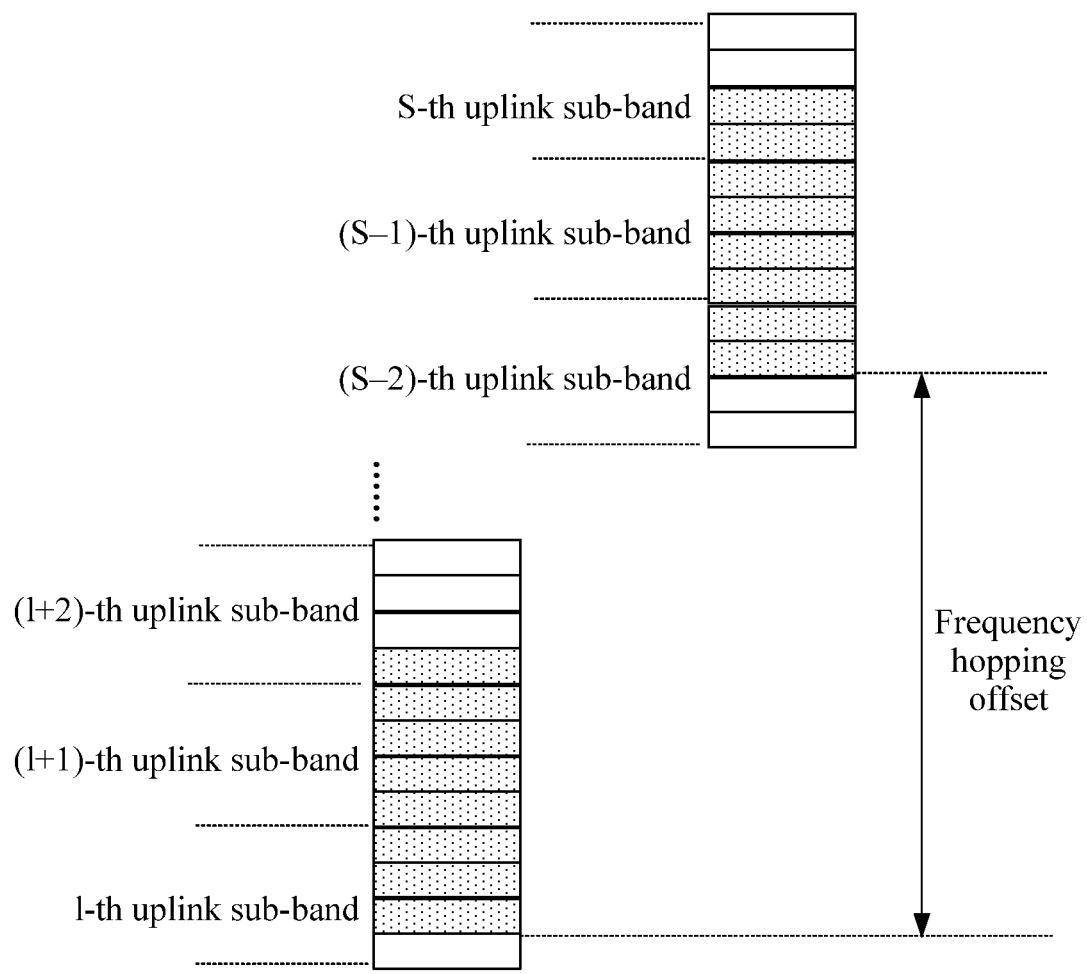
FIG. 6 is a schematic diagram of a frequency domain range of an uplink transmission channel scheduled by first DCI in the presence of frequency hopping.

In another embodiment, the N SRS resource groups exist, where the i-th SRS resource group contains $M_i$ SRS resources, and the first DCI indicates the frequency hopping and the frequency hopping offset. As shown in FIG. 6 which is a schematic diagram of a frequency domain range of an uplink transmission channel scheduled by first DCI in the presence of frequency hopping. A frequency domain range actually occupied by the uplink transmission channel is jointly determined by the frequency hopping indication in the first DCI, the frequency hopping offset indication in the first DCI and the frequency domain resource allocation in the first DCI. The multiple uplink sub-band numbers and the multiple sub-band SRS resource indications in the second DCI are based on the frequency domain range actually occupied by the uplink transmission channel. Remaining implementation methods, if not in conflict with other embodiments, may be implemented by the same methods.

Figure 7:
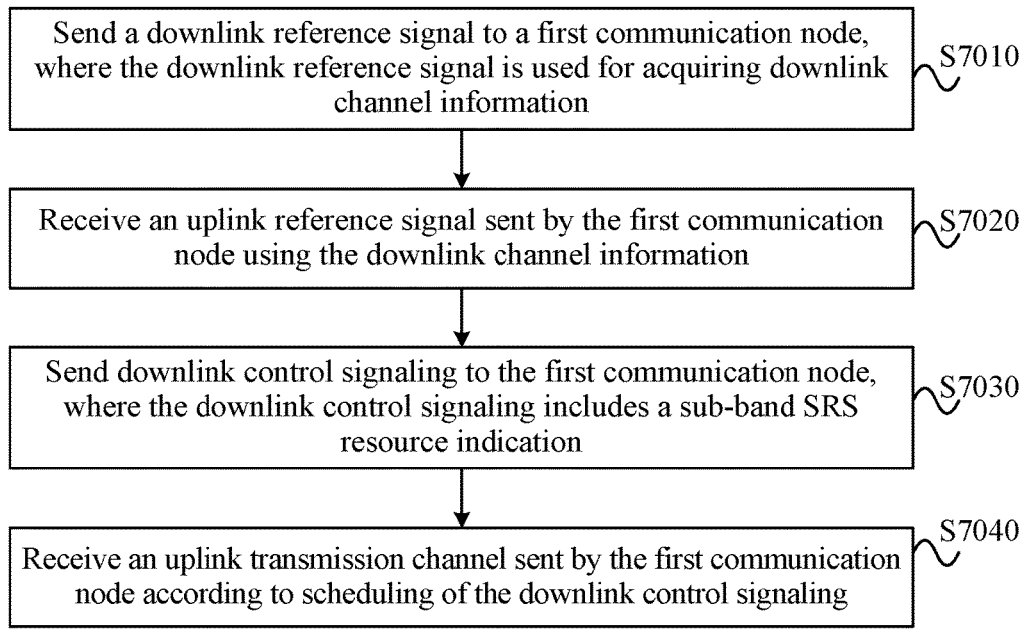
FIG. 7 is a flowchart of another uplink transmission method according to an embodiment.

FIG. 7 is a flowchart of another uplink transmission method according to an embodiment. As shown in FIG. 7, the method provided in the present embodiment includes the following.

In S7010, a downlink reference signal is sent to a first communication node, where the downlink reference signal is used for acquiring downlink channel information.

The uplink transmission method provided in the present embodiment is applied to a second communication node in a wireless communication system. The second communication node is, for example, a base station. In the wireless communication system, the base station performs downlink transmission using a downlink transmission channel and schedules through downlink control signaling the second communication node to send an uplink transmission channel. The base station sends downlink data and downlink signaling to a UE through the downlink transmission channel. When an uplink channel and a downlink channel between the base station and the UE have reciprocity, that is, the uplink channel and the downlink channel between the base station and the UE experience the same spatial environment, and the UE may send the uplink transmission channel using the downlink channel information acquired by the downlink reference signal sent by the base station. For example, for precoding used for the uplink transmission channel, a conventional uplink transmission channel uses wideband precoding. However, the wideband precoding has insufficient accuracy so that the performance of uplink transmission is improved to a limited extent. When the uplink channel and the downlink channel between the base station and the UE have the reciprocity, the present embodiment considers that precoding information calculated using the downlink channel information is applied to the uplink transmission channel.

Firstly, the base station as the second communication node sends the downlink reference signal to the first communication node, where the downlink reference signal includes the downlink channel information.

In S7020, an uplink reference signal sent by the first communication node using the downlink channel information is received.

After acquiring the downlink channel information, the first communication node calculates, based on the downlink channel information, the precoding information of the uplink transmission channel and caches the precoding information. From the cached precoding information, the precoding is selected for generating the uplink reference signal, and selection information of the precoding is cached. The second communication node receives the uplink reference signal sent by the first communication node.

In S7030, the downlink control signaling is sent to the first communication node, where the downlink control signaling includes a sub-band SRS resource indication.

After receiving the uplink reference signal sent by the first communication node, the second communication node sends the downlink control signaling to the first communication node. The downlink control signaling is used for scheduling the uplink transmission channel of the first communication node and includes the sub-band SRS resource indication. The sub-band SRS resource indication is used for indicating precoding of a sub-band of the uplink transmission channel, and the precoding used by the uplink transmission channel in a certain uplink sub-band is determined by a sub-band SRS resource indication corresponding to the uplink sub-band.

In S7040, the uplink transmission channel sent by the first communication node according to scheduling of the downlink control signaling is received.

After successfully monitoring the downlink control signaling, the first communication node may send the uplink transmission channel according to the scheduling of the downlink control signaling. Since the downlink control signaling includes the sub-band SRS resource indication, the first communication node may determine the precoding of the uplink transmission channel required to be transmitted according to the sub-band SRS resource indication in the downlink control signaling and send the uplink transmission channel. The second communication node receives the uplink transmission channel sent by the first communication node.

The uplink transmission method provided in the present embodiment is applied to the second communication node. The downlink reference signal is sent to the first communication node, where the downlink reference signal includes the downlink channel information. Then, the uplink reference signal sent by the first communication node using the downlink channel information is received. After the downlink control signaling is sent to the first communication node, where the downlink control signaling includes the sub-band SRS resource indication, the uplink transmission channel sent by the first communication node according to the scheduling of the downlink control signaling is received. In this manner, the precoding information of the uplink transmission channel can be calculated by using the downlink channel information when the uplink transmission channel and the downlink transmission channel have the reciprocity, which improves channel estimation accuracy and is conducive to enhancing the uplink transmission.

The uplink transmission method provided in the present embodiment and the uplink transmission method provided in the embodiment shown in FIG. 1 are processing on a base station side and processing on a UE side, respectively. The specific implementations have been described in detail in the embodiment shown in FIG. 1 and are not repeated in the present embodiment.

Figure 8:
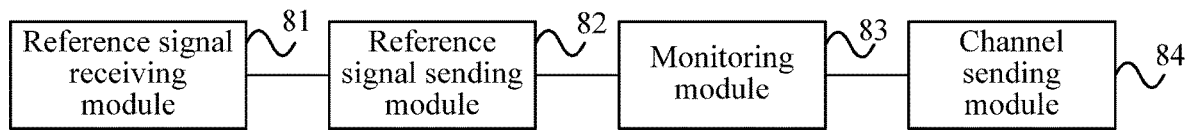
FIG. 8 is a structure diagram of an uplink transmission device according to an embodiment.

FIG. 8 is a structure diagram of an uplink transmission device according to an embodiment. The uplink transmission device provided in the present embodiment is disposed in a first communication node. As shown in FIG. 8, the uplink transmission device provided in the present embodiment includes a reference signal receiving module 81, a reference signal sending module 82, a monitoring module 83 and a channel sending module 84.

The reference signal receiving module 81 is configured to receive a downlink reference signal sent by a second communication node and acquire downlink channel information. The reference signal sending module 82 is configured to send an uplink reference signal using the downlink channel information. The monitoring module 83 is configured to monitor downlink control signaling sent by the second communication node, where the downlink control signaling includes a sub-band SRS resource indication. The channel sending module 84 is configured to send an uplink transmission channel according to scheduling of the downlink control signaling.

The uplink transmission device provided in the present embodiment is configured to implement the uplink transmission method in the embodiment shown in FIG. 1. The uplink transmission device provided in the present embodiment has similar implementation principles and technical effects, which are not repeated here.

Figure 9:
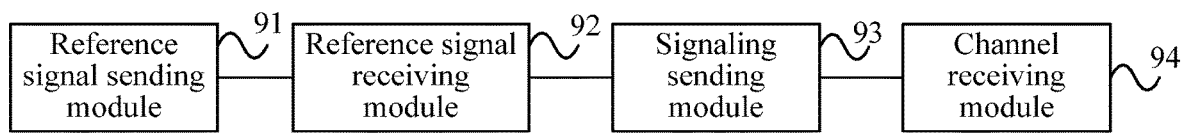
FIG. 9 is a structure diagram of another uplink transmission device according to an embodiment.

FIG. 9 is a structure diagram of another uplink transmission device according to an embodiment. The uplink transmission device provided in the present embodiment is disposed in a second communication node. As shown in FIG. 9, the uplink transmission device provided in the present embodiment includes a reference signal sending module 91, a reference signal receiving module 92, a signaling sending module 93 and a channel receiving module 94.

The reference signal sending module 91 is configured to send a downlink reference signal to a first communication node, where the downlink reference signal is used for acquiring downlink channel information. The reference signal receiving module 92 is configured to receive an uplink reference signal sent by the first communication node using the downlink channel information. The signaling sending module 93 is configured to send downlink control signaling to the first communication node, where the downlink control signaling includes a sub-band SRS resource indication. The channel receiving module 94 is configured to receive an uplink transmission channel sent by the first communication node according to scheduling of the downlink control signaling.

The uplink transmission device provided in the present embodiment is configured to implement the uplink transmission method in the embodiment shown in FIG. 7. The uplink transmission device provided in the present embodiment has similar implementation principles and technical effects, which are not repeated here.

Figure 10:
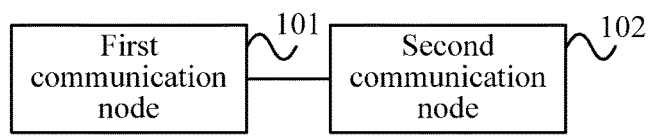
FIG. 10 is a structure diagram of an uplink transmission system according to an embodiment.

FIG. 10 is a structure diagram of an uplink transmission system according to an embodiment. As shown in FIG. 10, the uplink transmission system provided in the present embodiment includes a first communication node 101 and a second communication node 102. The first communication node 101 includes the uplink transmission device shown in FIG. 8, and the second communication node 102 includes the uplink transmission device shown in FIG. 9. The first communication node 101 is, for example, a UE. The second communication node 102 is, for example, a base station.

Figure 11:
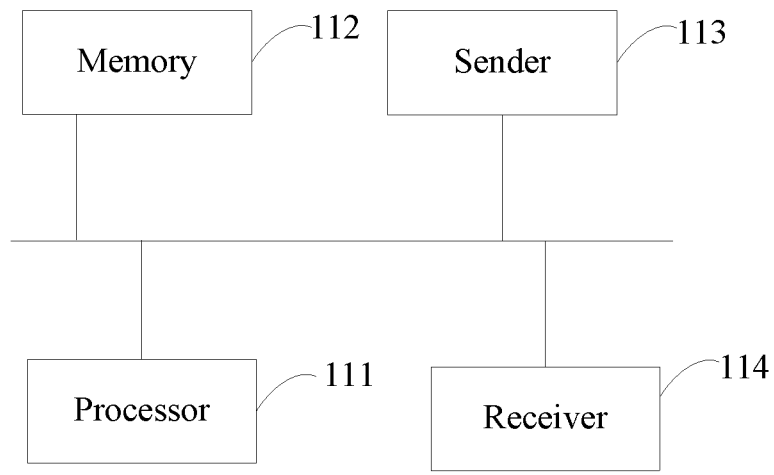
FIG. 11 is a structure diagram of a terminal according to an embodiment.

FIG. 11 is a structure diagram of a terminal according to an embodiment. As shown in FIG. 11, the terminal includes a processor 111, a memory 112, a sender 113 and a receiver 114. The number of the processor 111 in the terminal may be one or more, and one processor 111 is used as an example in FIG. 11. The processor 111 and the memory 112 in the terminal may be connected through a bus or in other manners. In FIG. 11, the connection through the bus is used as an example.

The memory 112, as a computer-readable storage medium, may be configured to store software programs, computer-executable programs and modules, such as program instructions/modules corresponding to the uplink transmission method in the embodiment of the present application shown in FIG. 1 (for example, the reference signal receiving module 81, the reference signal sending module 82, the monitoring module 83 and the channel sending module 84 in the uplink transmission device). The processor 111 executes software programs, instructions and modules stored in the memory 112 to implement at least one function application and data processing of the terminal, that is, to perform the uplink transmission method described above.

The memory 112 may mainly include a program storage region and a data storage region. The program storage region may store an operating system and an application program required by at least one function, and the data storage region may store data or the like created according to the use of the terminal. Additionally, the memory 112 may include a high-speed random-access memory and may further include a non-volatile memory such as at least one magnetic disk memory, a flash memory device or another non-volatile solid-state memory.

The sender 113 is a combination of modules or devices capable of transmitting radio frequency signals into space and includes, for example, a combination of a radio frequency transmitter, an antenna and another device. The receiver 114 is a combination of modules or devices capable of receiving radio frequency signals from space and includes, for example, a combination of a radio frequency receiver, an antenna and another device.

Figure 12:
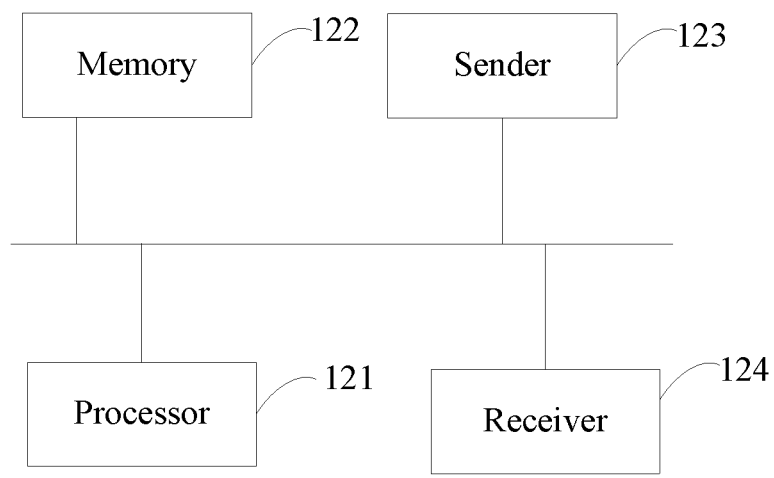
FIG. 12 is a structure diagram of a base station according to an embodiment.

FIG. 12 is a structure diagram of a base station according to an embodiment. As shown in FIG. 12, the base station includes a processor 121, a memory 122, a sender 123 and a receiver 124. The number of the processor 121 in the base station may be one or more, and one processor 121 is used as an example in FIG. 12. The processor 121 and the memory 122 in the base station may be connected through a bus or in other manners. In FIG. 12, the connection through the bus is used as an example.

The memory 122, as a computer-readable storage medium, may be configured to store software programs, computer-executable programs and modules, such as program instructions/modules corresponding to the uplink transmission method in the embodiment of FIG. 7 of the present application (for example, the reference signal sending module 91, the reference signal receiving module 92, the signaling sending module 93 and the channel receiving module 94 in the uplink transmission device). The processor 121 executes the software programs, instructions and modules stored in the memory 122 so that at least one function application and data processing of the base station is performed, that is, to perform the uplink transmission method described above.

The memory 122 may mainly include a program storage region and a data storage region. The program storage region may store an operating system and an application program required for at least one function, and the data storage region may store data or the like created according to the use of the base station. Additionally, the memory 122 may include a high-speed random access memory and may further include a non-volatile memory, for example, at least one magnetic disk memory device, flash memory device or another non-volatile solid-state memory device.

The sender 123 is a combination of modules or devices capable of transmitting radio frequency signals into space and includes, for example, a combination of a radio frequency transmitter, an antenna and another device. The receiver 124 is a combination of modules or devices capable of receiving radio frequency signals from space and includes, for example, a combination of a radio frequency receiver, an antenna and another device.

Embodiments of the present application further provide a storage medium containing a computer-executable instruction, where the computer-executable instruction, when executed by a processor of a computer, is used for performing an uplink transmission method. The method includes: receiving a downlink reference signal sent by a second communication node and acquiring downlink channel information; sending an uplink reference signal by using the downlink channel information; monitoring downlink control signaling sent by the second communication node, where the downlink control signaling includes a sub-band SRS resource indication; and sending an uplink transmission channel according to scheduling of the downlink control signaling.

Embodiments of the present application further provide a storage medium containing a computer-executable instruction, where the computer-executable instruction, when executed by a processor of a computer, is used for performing an uplink transmission method. The method includes: sending a downlink reference signal to a first communication node, where the downlink reference signal is used for acquiring downlink channel information; receiving an uplink reference signal sent by the first communication node using the downlink channel information; sending downlink control signaling to the first communication node, where the downlink control signaling includes a sub-band SRS resource indication; and receiving an uplink transmission channel sent by the first communication node according to scheduling of the downlink control signaling.

The above are only example embodiments of the present application and are not intended to limit the scope of the present application.

It is to be understood by those skilled in the art that the term "user terminal" covers any suitable type of radio UE, for example, a mobile phone, a portable data processing device, a portable web browser or a vehicle-mounted mobile station.

In general, multiple embodiments of the present application may be implemented in hardware, dedicated circuits, software, logics or any combination thereof. For example, some aspects may be implemented in hardware while other aspects may be implemented in firmware or software that may be executed by a controller, a microprocessor or other computing devices, although the present application is not limited thereto.

Embodiments of the present application may be implemented by computer program instructions executed by a data processor of a mobile device, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on multi-core processor architecture.

What is claimed is:

1. An uplink transmission method, the method being applied to a first communication node and comprising:
  receiving a downlink reference signal sent by a second communication node and acquiring downlink channel information;
  sending an uplink reference signal by using the downlink channel information;
  monitoring downlink control signaling sent by the second communication node, wherein the downlink control signaling comprises a sub-band sounding reference signal (SRS) resource indication; and
  sending an uplink transmission channel according to scheduling of the downlink control signaling,
  wherein one of the following is satisfied:
  the uplink reference signal comprises N SRS resource groups and an i-th SRS resource group comprises $M_i$ SRS resources, wherein each of the N SRS resource groups is associated with one downlink reference signal, i, N and $M_i$ are integers greater than or equal to 1, and $1 \leq i \leq N$;

sending the uplink reference signal by using the downlink channel information comprises: determining precoding of each uplink sub-band of the uplink reference signal according to the downlink channel information; and generating the uplink reference signal according to the precoding of each uplink sub-band of the uplink reference signal and sending the uplink reference signal; wherein a division manner of the uplink sub-band includes at least one of the following: division is performed according to a bandwidth of a carrier component where the uplink transmission channel is located and a size of sub-band division granularity, division is performed according to a frequency domain range of a bandwidth part (BWP) where the uplink transmission channel is located and a size of sub-band division granularity, or division is performed according to a frequency domain range of an SRS resource and a size of sub-band division granularity; or wherein the sub-band SRS resource indication is used for indicating precoding of the uplink transmission channel and precoding used on each uplink sub-band by the uplink transmission channel is jointly determined by a sub-band SRS resource indication corresponding to the each uplink sub-band and the precoding of each uplink sub-band of the uplink reference signal; or the downlink control signaling comprises any one of the following: one downlink control information (DCI) for scheduling the uplink transmission channel, two DCIs for independently scheduling the uplink transmission channel, or two DCIs for jointly scheduling the uplink transmission channel, wherein frequency domain ranges indicated by the two DCIs for independently scheduling the uplink transmission channel do not overlap and each of the two DCIs for independently scheduling the uplink transmission channel contains the sub-band SRS resource indication, or wherein the two DCIs for jointly scheduling the uplink transmission channel comprise first DCI and second DCI by which the uplink transmission channel is jointly scheduled.

2. The method according to claim 1, wherein the first DCI comprises at least one of the following information: frequency domain resource allocation, an SRS resource indication, an SRS resource group indication, a demodulation reference signal (DMRS) port indication, or an indication of a size of the second DCI; and the second DCI comprises at least one of the following information: a plurality of uplink sub-band numbers, a plurality of sub-band SRS resource indications, the modulation and coding scheme, the redundancy version, a redundancy version offset, the DMRS sequence initialization indication or a DMRS sequence initialization offset indication.

3. The method according to claim 2, wherein a size of information bits of the second DCI is determined in at least one of the following:

the indication of the size of the second DCI in the first DCI;

the SRS resource indication in the first DCI and the frequency domain resource allocation in the first DCI; or an association relationship between an SRS resource and a phase tracking reference signal (PTRS) port, the SRS resource indication in the first DCI and the frequency domain resource allocation in the first DCI.

4. The method according to claim 2, wherein a relationship between the plurality of uplink sub-band numbers and the plurality of sub-band SRS resource indications in the second DCI comprises at least one of the following manners:

the second DCI contains the plurality of sub-band SRS resource indications and no uplink sub-band numbers;

the second DCI contains the plurality of uplink sub-band numbers and the plurality of sub-band SRS resource indications, wherein one of the plurality of uplink sub-band numbers corresponds to one of the plurality of sub-band SRS resource indications; or the second DCI contains the plurality of uplink sub-band numbers and the plurality of sub-band SRS resource indications, wherein one group of uplink sub-band numbers among the plurality of uplink sub-band numbers corresponds to one of the plurality of sub-band SRS resource indications.

5. The method according to claim 1, wherein a number of layers of the uplink transmission channel is determined by at least one of the following:

an SRS resource indication in the first DCI;

a DMRS port indication in the first DCI; or a plurality of sub-band SRS resource indications in the second DCI.

6. The method according to claim 1, wherein sending the uplink transmission channel according to the scheduling of the downlink control signaling comprises:

in a case where the second DCI fails to be monitored, scheduling the uplink transmission channel according to the first DCI; and in a case where the second DCI is successfully monitored, jointly scheduling the uplink transmission channel according to the first DCI and the second DCI.

7. An uplink transmission method, the method being applied to a second communication node and comprising:

sending a downlink reference signal to a first communication node, wherein the downlink reference signal is used for acquiring downlink channel information;

receiving an uplink reference signal sent by the first communication node using the downlink channel information;

sending downlink control signaling to the first communication node, wherein the downlink control signaling comprises a sub-band sounding reference signal (SRS) resource indication; and receiving an uplink transmission channel sent by the first communication node according to scheduling of the downlink control signaling;

wherein receiving the uplink reference signal sent by the first communication node using the downlink channel information comprises:

receiving the uplink reference signal sent by the first communication node, which is generated according to precoding of each uplink sub-band of the uplink reference signal after the first communication node determines the precoding of each uplink sub-band of the uplink reference signal according to the downlink channel information; and wherein a division manner of the uplink sub-band includes at least one of the following:

division is performed according to a bandwidth of a carrier component where the uplink transmission channel is located and a size of sub-band division granularity;

division is performed according to a frequency domain range of a bandwidth part (BWP) where the uplink transmission channel is located and a size of sub-band division granularity; or division is performed according to a frequency domain range of an SRS resource and a size of sub-band division granularity.

8. An uplink transmission device, comprising a processor and a memory, wherein the processor is configured to execute a program instruction stored in the memory to perform the following:

receiving a downlink reference signal sent by a second communication node and acquiring downlink channel information;

sending an uplink reference signal by using the downlink channel information;

monitoring downlink control signaling sent by the second communication node, wherein the downlink control signaling comprises a sub-band sounding reference signal (SRS) resource indication; and sending an uplink transmission channel according to scheduling of the downlink control signaling, wherein one of the following is satisfied:

the uplink reference signal comprises N SRS resource groups and an i-th SRS resource group comprises $M_i$ SRS resources, wherein each of the N SRS resource groups is associated with one downlink reference signal, i, N and $M_i$ are integers greater than or equal to 1, and $1 \leq i \leq N$;

sending the uplink reference signal by using the downlink channel information comprises: determining precoding of each uplink sub-band of the uplink reference signal according to the downlink channel information; and generating the uplink reference signal according to the precoding of each uplink sub-band of the uplink reference signal and sending the uplink reference signal; wherein a division manner of the uplink sub-band includes at least one of the following: division is performed according to a bandwidth of a carrier component where the uplink transmission channel is located and a size of sub-band division granularity, division is performed according to a frequency domain range of a bandwidth part (BWP) where the uplink transmission channel is located and a size of sub-band division granularity, or division is performed according to a frequency domain range of an SRS resource and a size of sub-band division granularity; or wherein the sub-band SRS resource indication is used for indicating precoding of the uplink transmission channel and precoding used on each uplink sub-band by the uplink transmission channel is jointly determined by a sub-band SRS resource indication corresponding to the each uplink sub-band and the precoding of each uplink sub-band of the uplink reference signal; or the downlink control signaling comprises any one of the following: one downlink control information (DCI) for scheduling the uplink transmission channel, two DCIs for independently scheduling the uplink transmission channel, or two DCIs for jointly scheduling the uplink transmission channel, wherein frequency domain ranges indicated by the two DCIs for independently scheduling the uplink transmission channel do not overlap and each of the two DCIs for independently scheduling the uplink transmission channel contains the sub-band SRS resource indication, or wherein the two DCIs for jointly scheduling the uplink transmission channel comprise first DCI and second DCI by which the uplink transmission channel is jointly scheduled.

9. An uplink transmission device, comprising a processor and a memory, wherein the processor is configured to execute a program instruction stored in the memory to perform the uplink transmission method according to claim 7.

* * * * *